United States Patent
Ottmann et al.

(10) Patent No.: US 11,168,507 B2
(45) Date of Patent: Nov. 9, 2021

(54) KINEMATIC CONTROL SYSTEM FOR AN AUTOMATIC SLIDING PANEL

(71) Applicant: Technology Construction, Inc., Prescott, AZ (US)

(72) Inventors: Michael H. Ottmann, Prescott, AZ (US); Jonathon Cox, Prescott, AZ (US)

(73) Assignee: Technology Construction, Inc., Prescott, AZ (US)

( * ) Notice: Subject to any disclaimer, the term of this patent is extended or adjusted under 35 U.S.C. 154(b) by 249 days.

(21) Appl. No.: 16/435,093

(22) Filed: Jun. 7, 2019

(65) Prior Publication Data
US 2020/0071983 A1 Mar. 5, 2020

Related U.S. Application Data

(60) Provisional application No. 62/724,474, filed on Aug. 29, 2018.

(51) Int. Cl.
| | | |
|---|---|---|
| *E05F 15/00* | (2015.01) | |
| *E05F 15/73* | (2015.01) | |
| *E05F 15/60* | (2015.01) | |
| *G01S 17/04* | (2020.01) | |

(52) U.S. Cl.
CPC .............. *E05F 15/73* (2015.01); *E05F 15/60* (2015.01); *G01S 17/04* (2020.01); *E05Y 2900/132* (2013.01); *E05Y 2900/148* (2013.01)

(58) Field of Classification Search
CPC ......... E05F 15/60; E05F 15/643; E05F 15/73; E05F 2015/765; G01S 17/10; G01S 17/36; G01S 17/04; G01S 17/88; G01S 7/4808; E05Y 2900/148; E05Y 2400/86; E05Y 2800/21; E05Y 2900/132
USPC .......................................................... 49/31
See application file for complete search history.

(56) References Cited

U.S. PATENT DOCUMENTS

| | | | | |
|---|---|---|---|---|
| 6,049,287 | A * | 4/2000 | Yulkowski | A62C 2/24 292/251.5 |
| 6,469,464 | B1 * | 10/2002 | McCall | E05F 15/668 318/245 |
| 10,724,285 | B2 * | 7/2020 | Dodge | E05F 5/003 |
| 2002/0066228 | A1 * | 6/2002 | Janutta | E05D 15/12 49/127 |
| 2007/0108927 | A1 * | 5/2007 | Valencia | E05F 15/643 318/282 |
| 2008/0250716 | A1 * | 10/2008 | Ranaudo | E05B 65/08 49/31 |
| 2009/0093913 | A1 * | 4/2009 | Copeland, II | E05F 1/002 700/282 |
| 2016/0215554 | A1 * | 7/2016 | Uno | E05F 15/60 |
| 2018/0328098 | A1 * | 11/2018 | Hsu | G06K 9/00201 |
| 2019/0383089 | A1 * | 12/2019 | Gaviglia | E05F 15/646 |
| 2020/0208459 | A1 * | 7/2020 | Trobro | E05F 15/603 |
| 2021/0102999 | A1 * | 4/2021 | Hamakubo | E05F 15/632 |

* cited by examiner

*Primary Examiner* — Chi Q Nguyen
(74) *Attorney, Agent, or Firm* — Polsinelli PC; Ari M. Bai

(57) ABSTRACT

Embodiments for a kinematic control system for controlling the operation and movement of sliding panel for are disclosed.

19 Claims, 30 Drawing Sheets

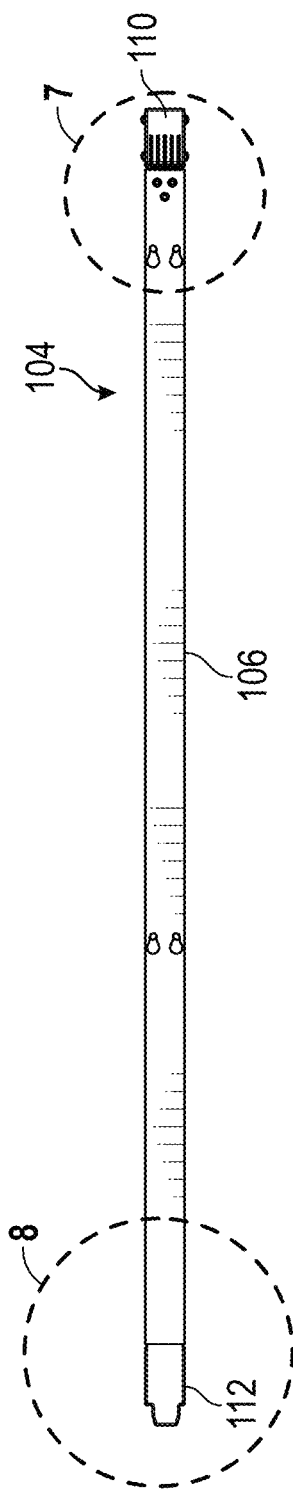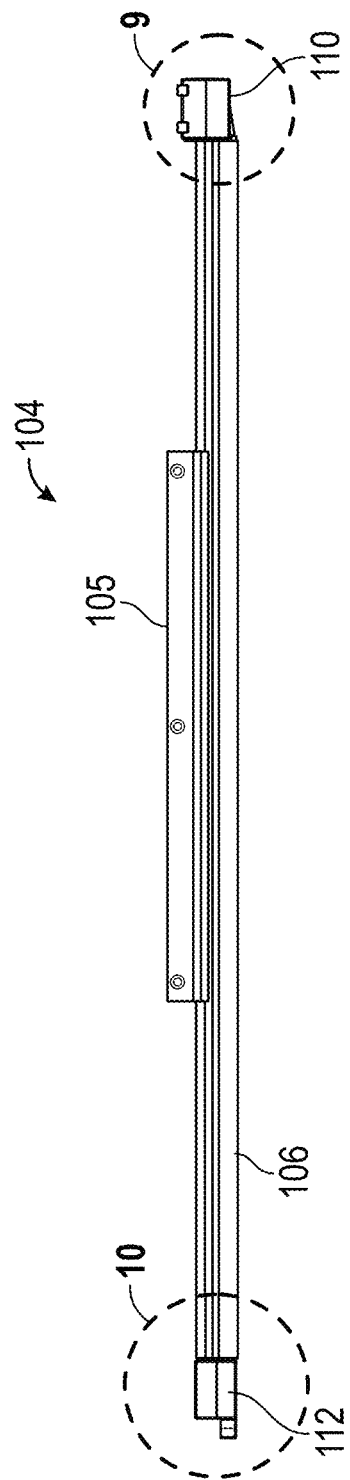
FIG. 3
FIG. 4

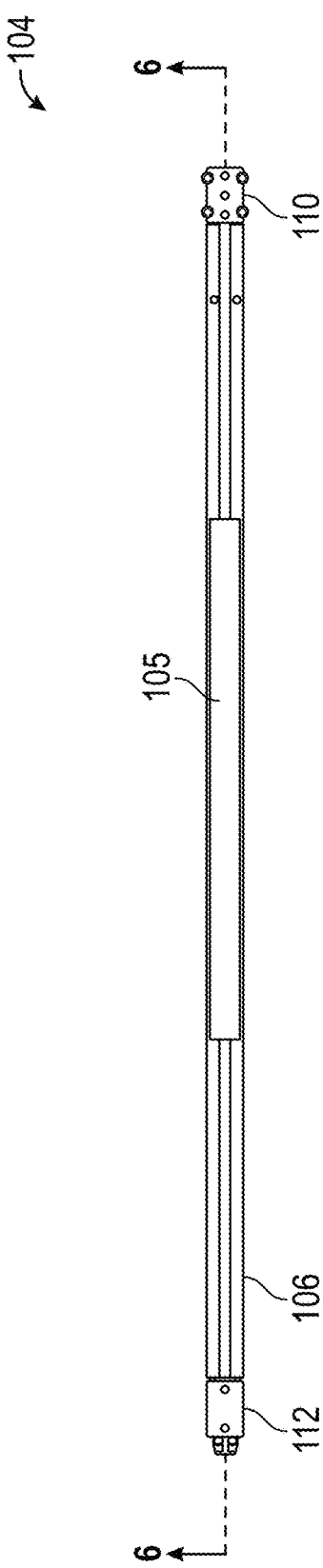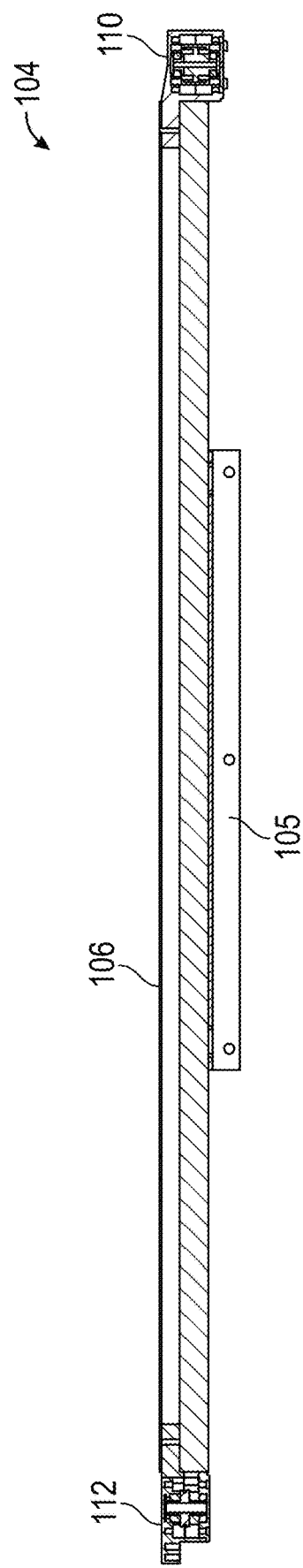

Time-of-Flight Diagram

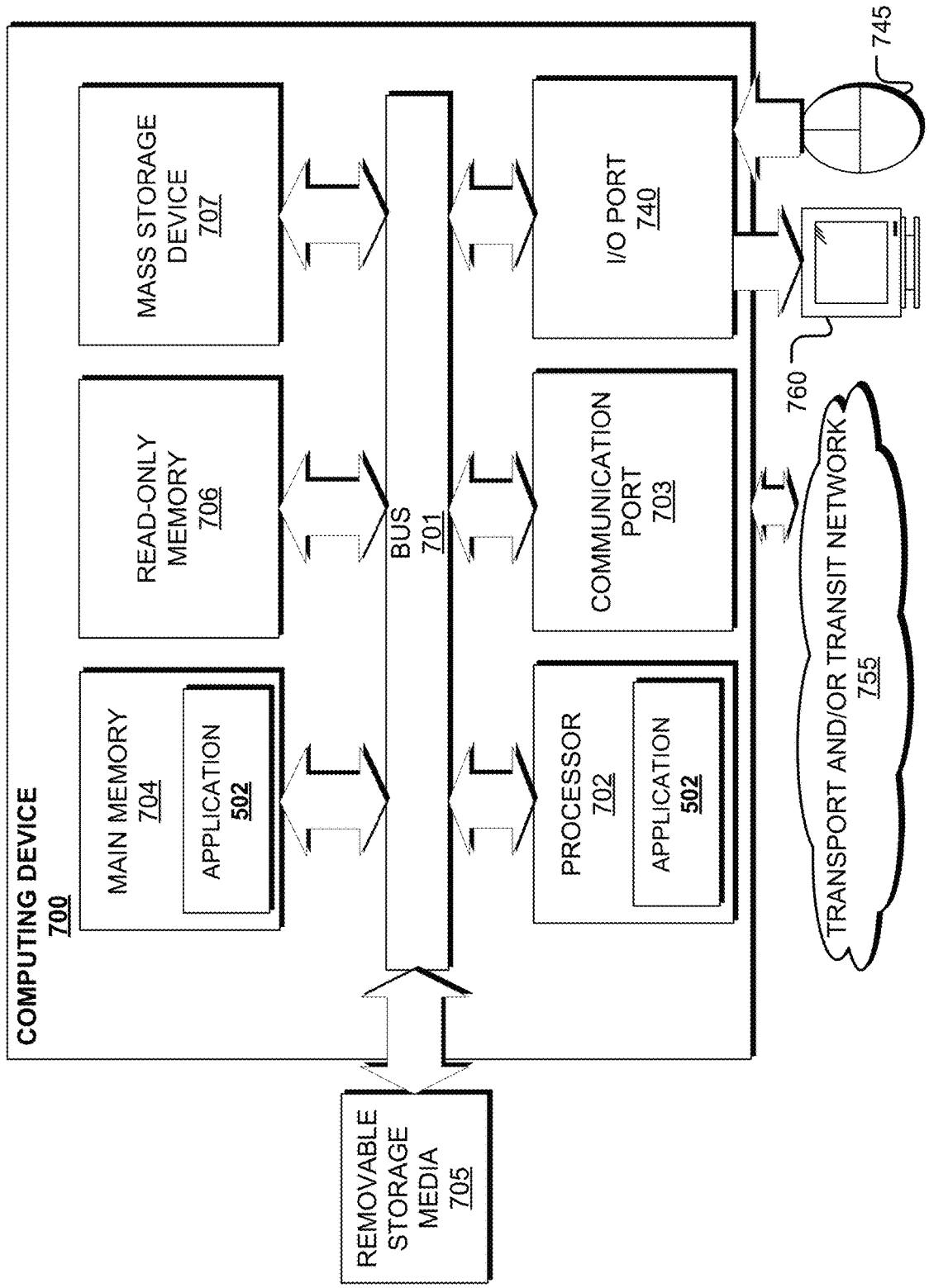

KINEMATIC CONTROL SYSTEM FOR AN AUTOMATIC SLIDING PANEL

CROSS REFERENCE TO RELATED APPLICATIONS

This is a non-provisional application that claims benefit to U.S. provisional application Ser. No. 62/724,474, filed on Aug. 29, 2018, which is herein incorporated by reference in its entirety.

FIELD

The present disclosure generally relates to kinematic control system for an automatic sliding door or window panel, and in particular to systems and methods for kinematic control of an automatic sliding door or window panel without physical contact.

BACKGROUND

Automatic sliding doors in both residential and commercial applications allow a door to slide automatically between closed and open positions. Typically, automatic sliding doors include a motor and activation system to open and close them. The advantages of automatic sliding doors is that very little room is required to open the door, they are relatively easy to automate and they also tend to be secure, since the doors cannot be lifted out of their hinges. However, the various motor and activation systems used with automatic sliding doors, commonly referred to as sliding door operators, may include an electric motor, geared down to get a lower speed and a higher torque, drives a pulley at one end of a belt. In addition, the automatic sliding door may include a sensor that detects the proximity of a person approaching such that electric motor is activated and automatically opens and closes the sliding door. However, further improvements in sliding door technology are desired to enhance the control system for better controlling the operation of the automatic sliding door.

It is with these observations in mind, among others, that various aspects of the present disclosure were conceived and developed.

BRIEF DESCRIPTION OF THE DRAWINGS

FIG. 3 is a bottom view of the slide and rail assembly of FIG. 2;

FIG. 4 is a side view of the slide and rail assembly of FIG. 2;

FIG. 5 is a top view of the slide and rail assembly of FIG. 2;

FIG. 6 is a cross-sectional view of the slide and rail assembly of FIG. 5 taken along line 6-6;

FIG. 45 is a simplified block diagram of a possible computing device that may be configured to implement aspects of the algorithms or other features described herein.

Corresponding reference characters indicate corresponding elements among the view of the drawings. The headings used in the figures do not limit the scope of the claims.

DETAILED DESCRIPTION

Figure 1:
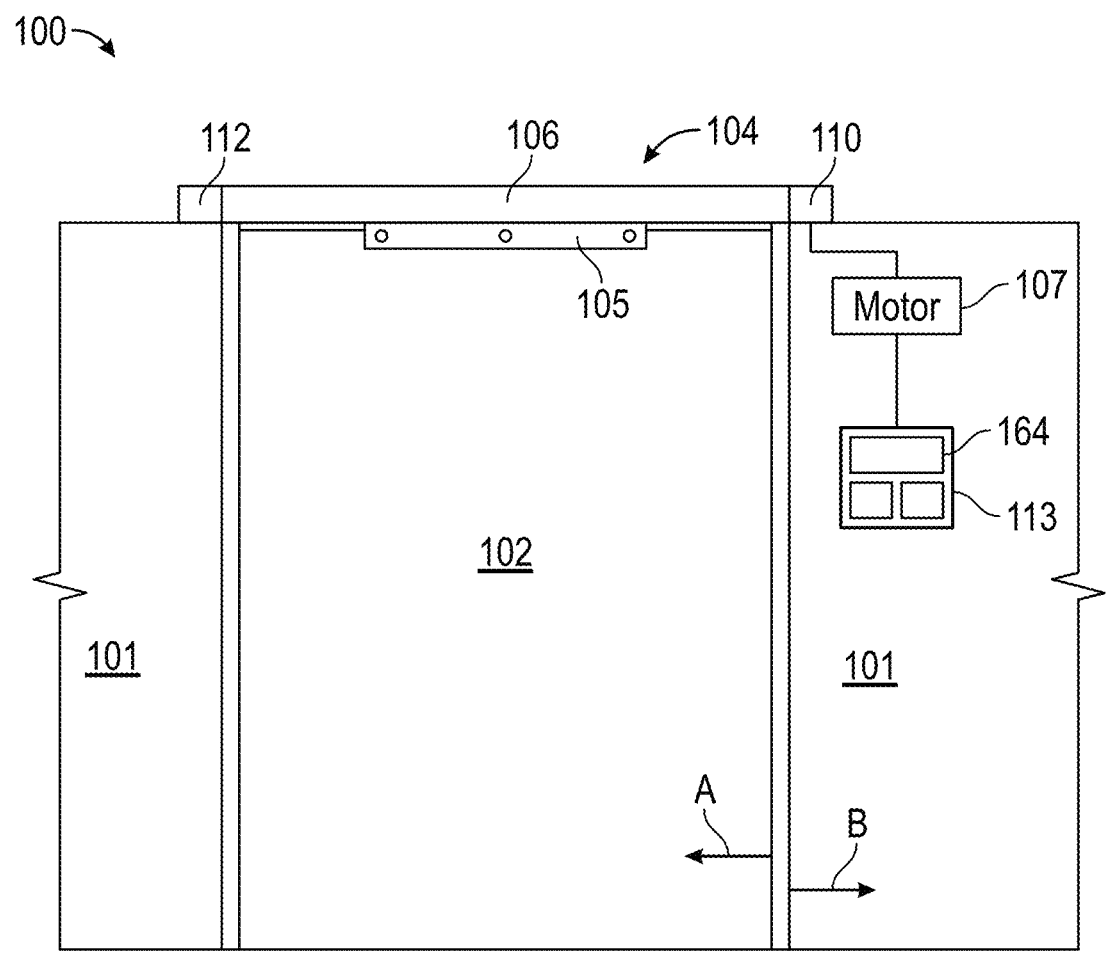
FIG. 1 is a simplified illustration of an automatic sliding door system for remotely controlling the operation of slide and rail assembly operatively coupled to a door panel and frame.
Figure 2:
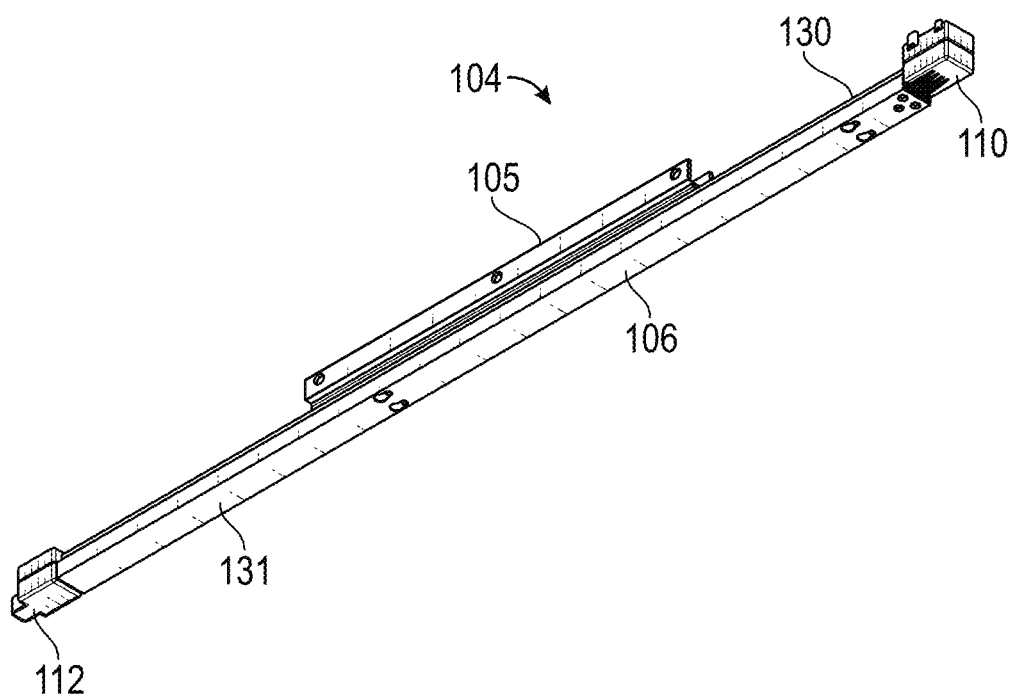
FIG. 2 is a perspective view of the slide and rail assembly of FIG. 1.
Figure 7:
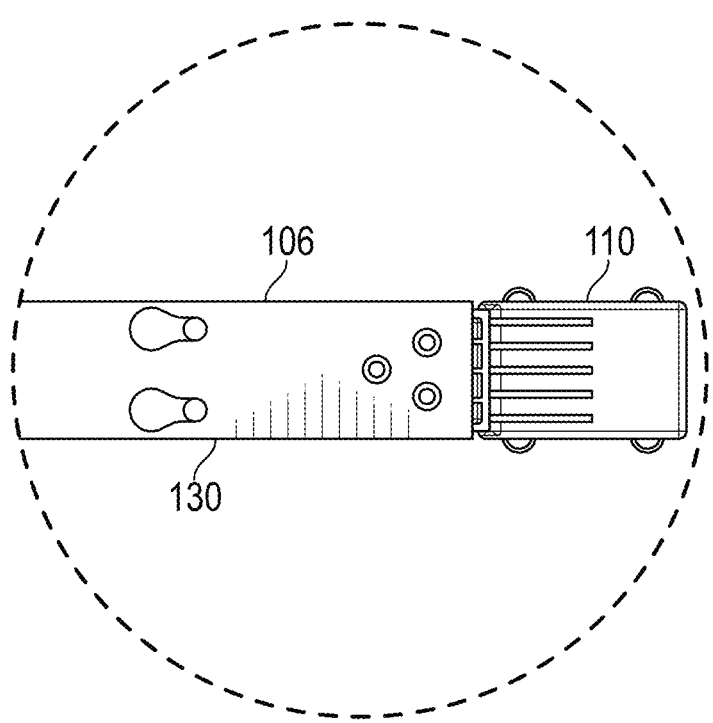
FIG. 7 is an enlarged view of a spool drive box of the slide and rail assembly of FIG. 3.
Figure 8:
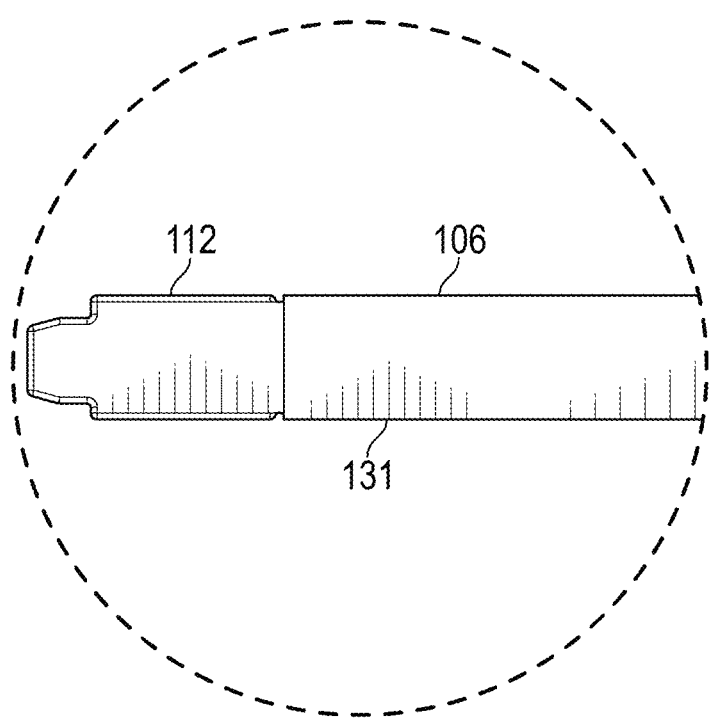
FIG. 8 is an enlarged view of a pulley component of the slide and rail assembly of FIG. 3.
Figure 9:
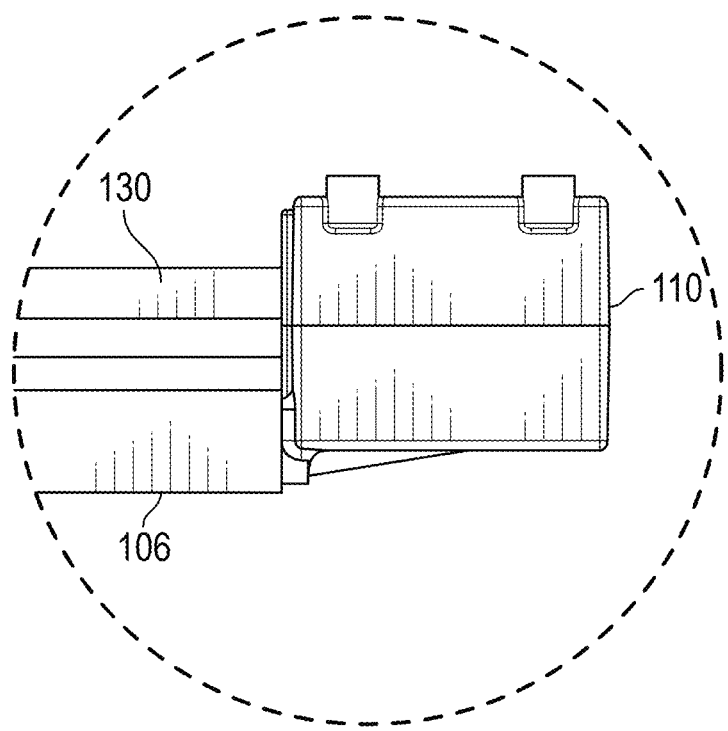
FIG. 9 is an enlarged view of the spool drive box of the slide and rail assembly of FIG. 4.
Figure 10:
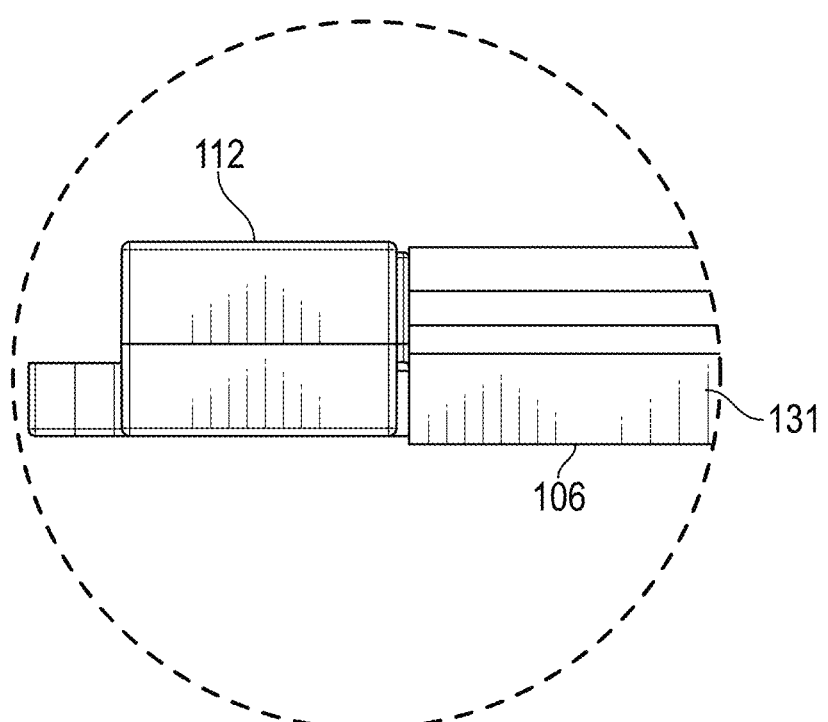
FIG. 10 is an enlarged view of the pulley component of the slide and rail assembly of FIG. 4.

Aspects of the present disclosure relate to systems and methods for controlling an automatic sliding panel, such as a window or door, having a slide and rail assembly for commercial or residential applications. In particular, in one aspect, the present novel concept includes a control system that can be employed with a slide and rail assembly comprises at least one sensor and a microprocessor that executes software to adjust various operational parameters of the slide and rail assembly to operate an automatic sliding door or window panel. In one aspect, the control system provides kinematic control of the automatic sliding door or window panel by interpreting various hand motions and gestures. Referring to the drawings, embodiments of an automatic sliding door system having a slide and rail assembly and kinematic control system are illustrated and generally indicated as 100 in FIGS. 1-45.

Figure 31:
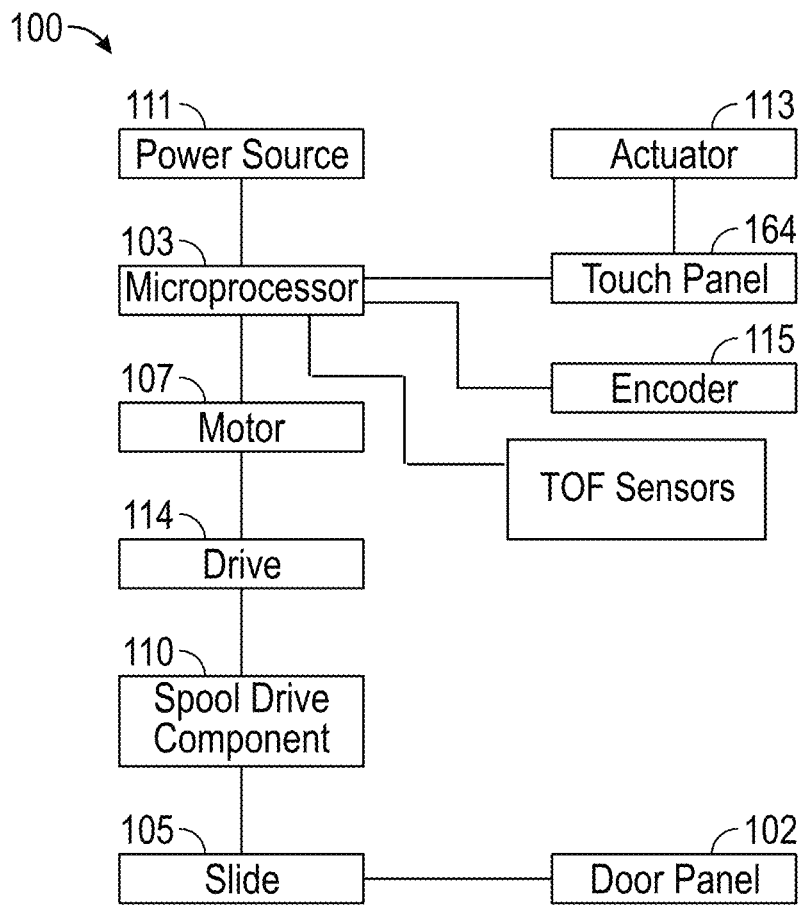
FIG. 31 is a simplified block diagram of the various basic components of the automatic slide and rail assembly system.

Referring to FIG. 1, one embodiment of the automatic sliding door system 100 includes a sliding door panel 102 that is operatively coupled to a frame 101 through a slide and rail assembly 104 that allows the sliding door panel 102 to automatically slide between open and closed positions. The slide and rail assembly 104 is drives the sliding door panel 102 between the open and closed positions by a motor 107 that is in operative engagement with the slide and rail assembly 104. As shown in FIGS. 1 and 31, the motor 107 communicates with an actuator 113 through a touch panel 164 which functions to actuate the sliding door panel 104 either remotely or directly between open and closed positions as shall be described in greater detail below.

Referring to FIGS. 1-14, the slide and rail assembly 104 includes a slide 105 that is in sliding engagement with a linear slide rail 106 through a linear run 129 that extends along the length of the linear slide rail 106. As shown in FIG. 1, the linear slide rail 106 is secured to the frame 101 and the slide 105 is directly engaged to the top portion of the sliding door panel 102 for operating the sliding door panel 102 between open and closed positions.

Figure 11:
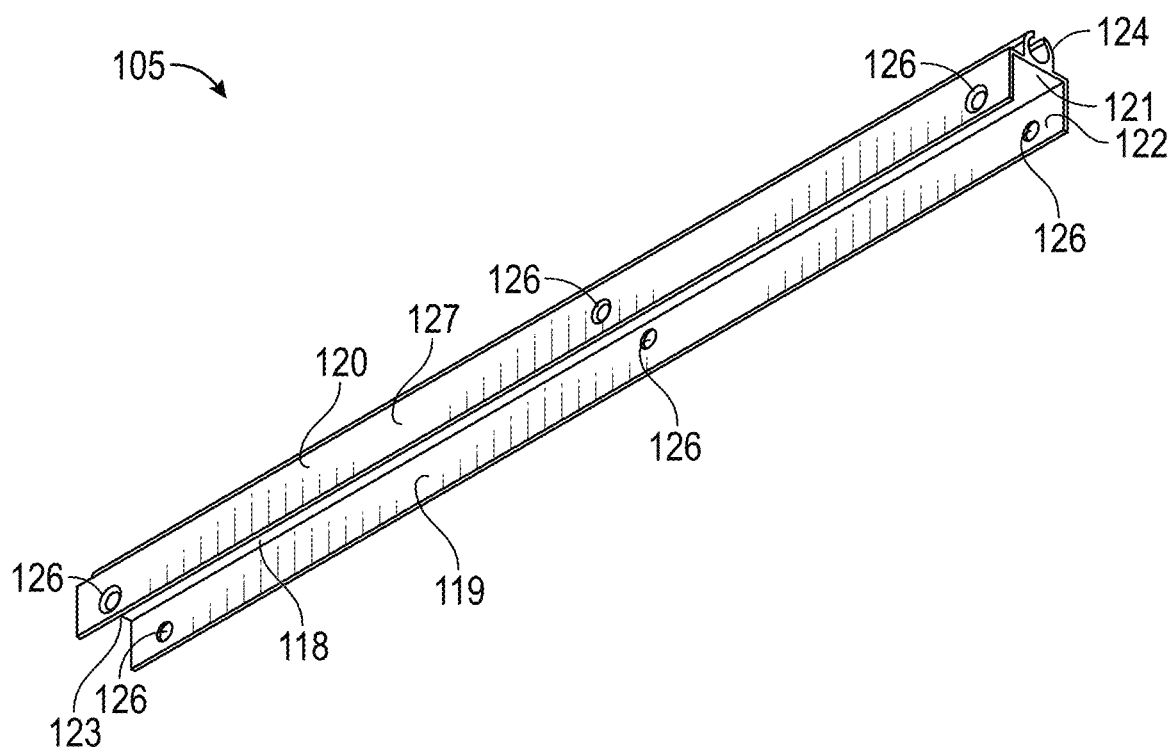
FIG. 11 is a perspective view of a slide for the slide and rail assembly.
Figure 12:
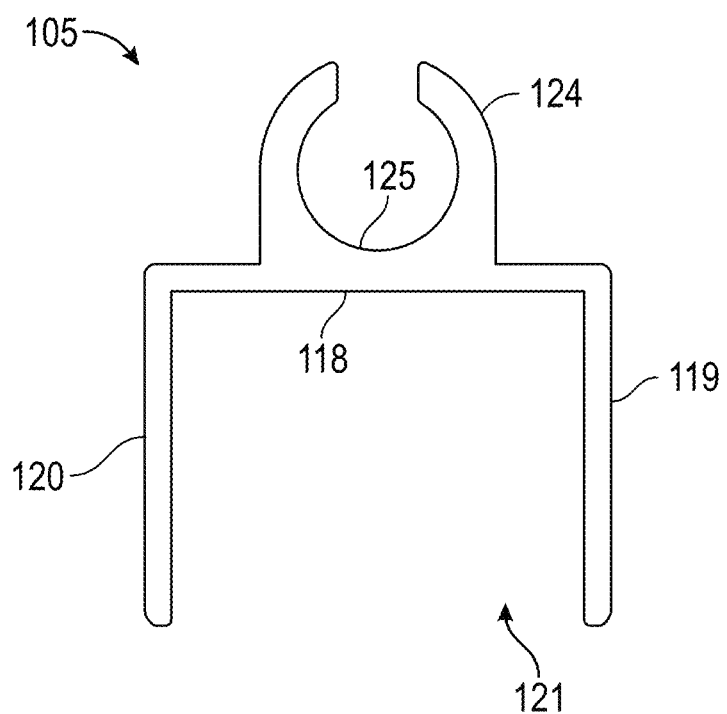
FIG. 12 is an end view of the slide of FIG. 11.

As shown in FIGS. 11 and 12, the slide 105 includes an elongated body 127 collectively defined by a middle portion 118, a first side portion 119 and a second side portion 120 such that an open channel 121 is collectively formed which is configured to receive the top portion of the door panel 102 (FIG. 1). In addition, the open channel 121 communicates with a distal open end 122 formed at one end of the slide 105 and a proximal open end 123 formed at the opposite end of the slide 105. The middle portion 118 of the slide 105 further defines an elongated runner portion 124 having a channel 125 that extends the length of the slide 105 and provides a surface for engaging the linear run 129 of the linear slide rail 106 to the slide 105. In some embodiments, the first and second side portions 119 and 120 may define a plurality of aligned apertures 126 configured to receive a respective securing member (not shown) that secures the top portion of the door panel 102 within the open channel 121 of the slide 105.

Figure 13:
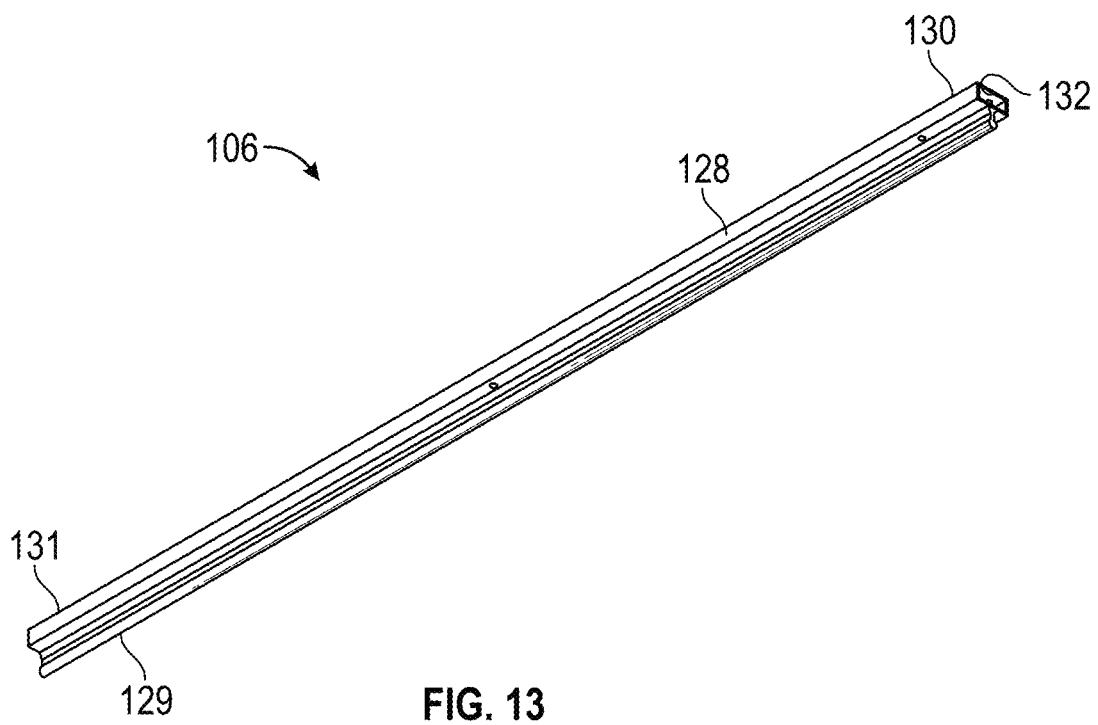
FIG. 13 is a perspective view of a linear slide rail for the slide and rail assembly.
Figure 14:
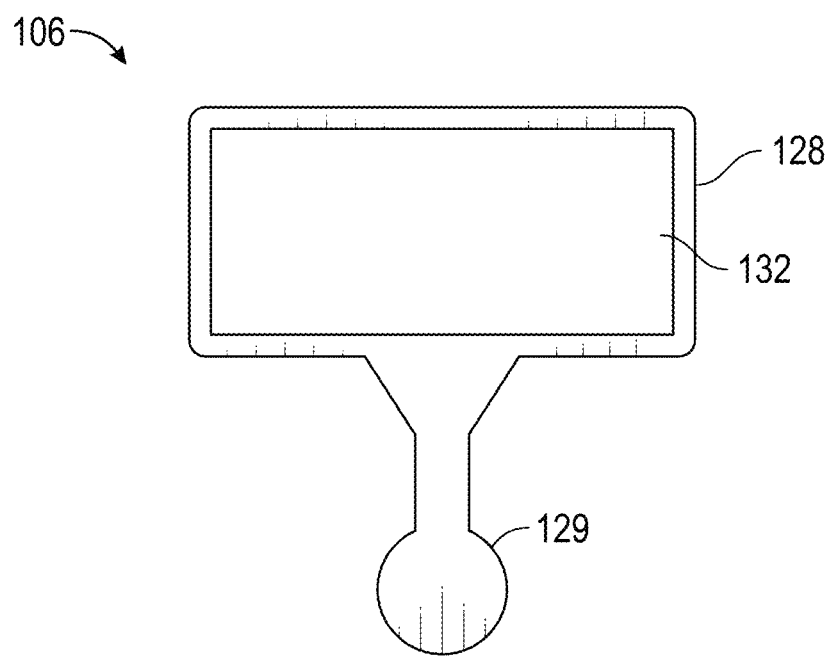
FIG. 14 is an end view of the linear slide rail.

Referring to FIGS. 13 and 14, the linear slide rail 106 includes an elongated housing 128 that defines a channel 132 that communicates between a distal open end 130 formed at one end of the elongated housing 128 and a proximal open end 131 at an opposite end of the elongated housing 128. As shown, the linear run 129 extends the length of the linear slide rail 106 and is configured to be disposed within the open channel 125 of the runner portion 124 such that the slide 105 may be driven along the linear run 129 by operation of the motor 107.

Figure 32:
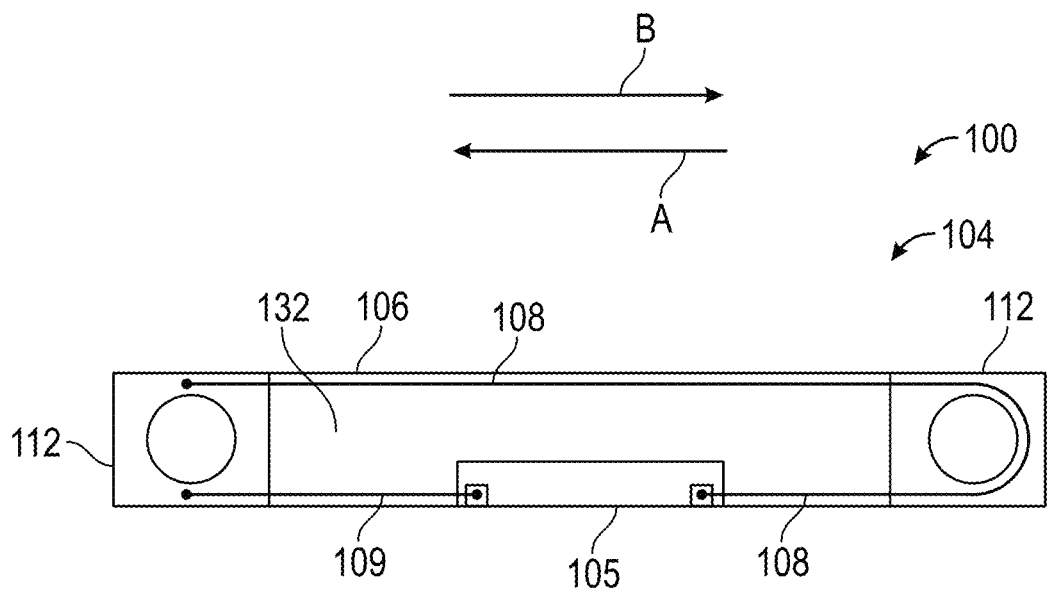
FIG. 32 is a simplified illustration showing the connection of top cord between the spool drive component and the slide and the connection of the bottom cord between the spool drive component and the slide.

As shown in FIGS. 1-10 and 15-22, the slide and rail assembly 104 further includes a spool drive component 110 engaged to the distal open end 130 of the linear slide rail 106 and a pulley component 112 engaged to the proximal open end 131 of the linear slide rail 106. Referring to FIG. 32, the spool drive component 110 drives a top cord 108 and a bottom cord 109 coupled between the spool drive component 110, pulley component 110, and slide 105. As shown, the bottom cord 108 is engaged between the spool drive component 110 and the proximal open end 123 of the slide 105 as well as being coupled around the pulley component 112, while the bottom cord 109 is engaged between the spool drive component 110 and the distal open end 123 of the slide 105. In one aspect, the spool drive component 110 is operable to drive the top cord 108 in the proximal direction B and the bottom cord 109 concurrently in the distal direction A such that the slide 105 and the door panel 102 are driven in the distal direction A (e.g., open position). Conversely, the spool drive component 110 is operable to drive the top cord 108 in the distal direction A and the bottom cord 108 concurrently in the proximal direction B such that the slide 105 and door panel 102 are now driven in the proximal direction B (e.g., closed position).

Figure 15:
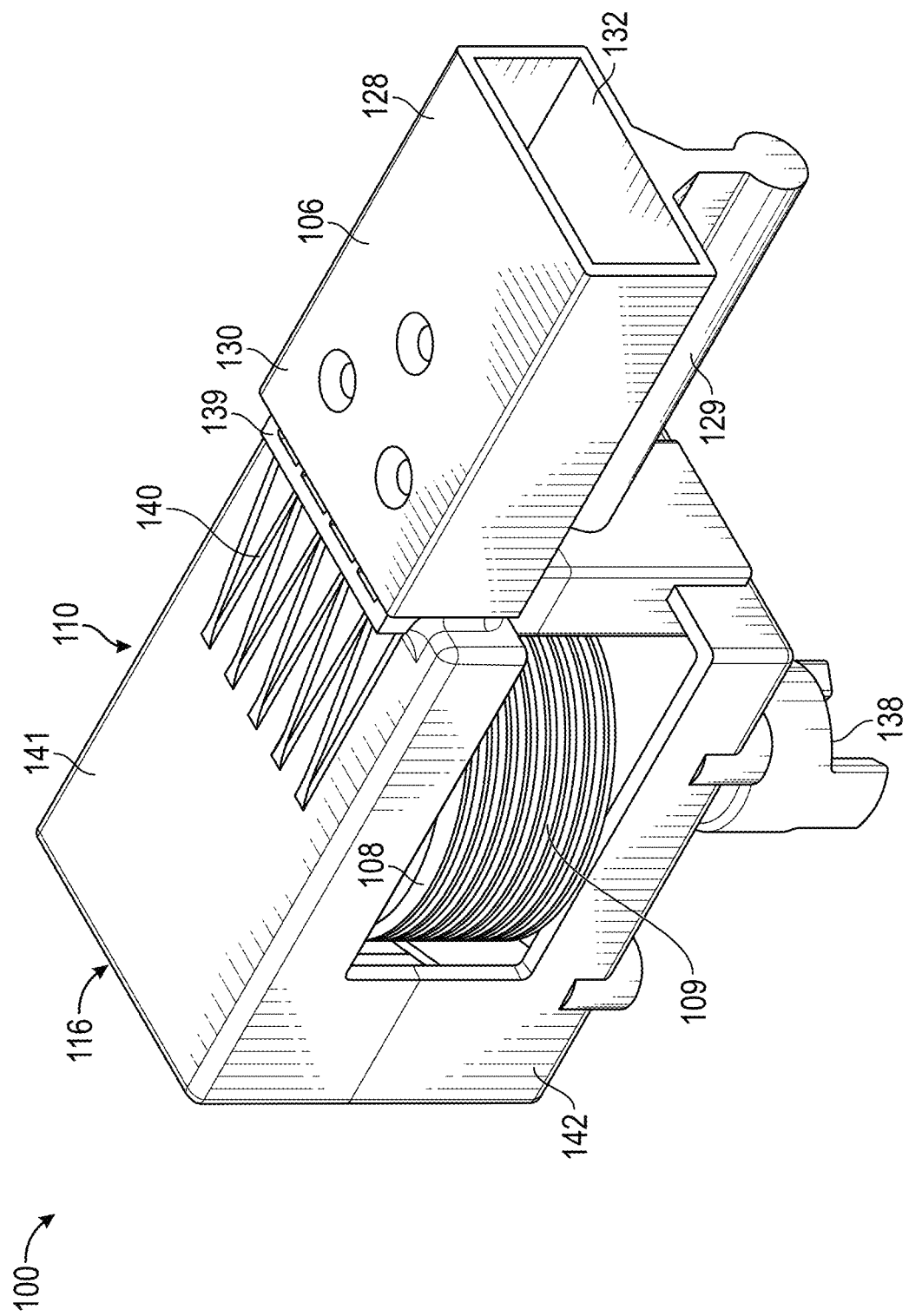
FIG. 15 is a perspective view of the spool drive box of FIG. 2.
Figure 16:
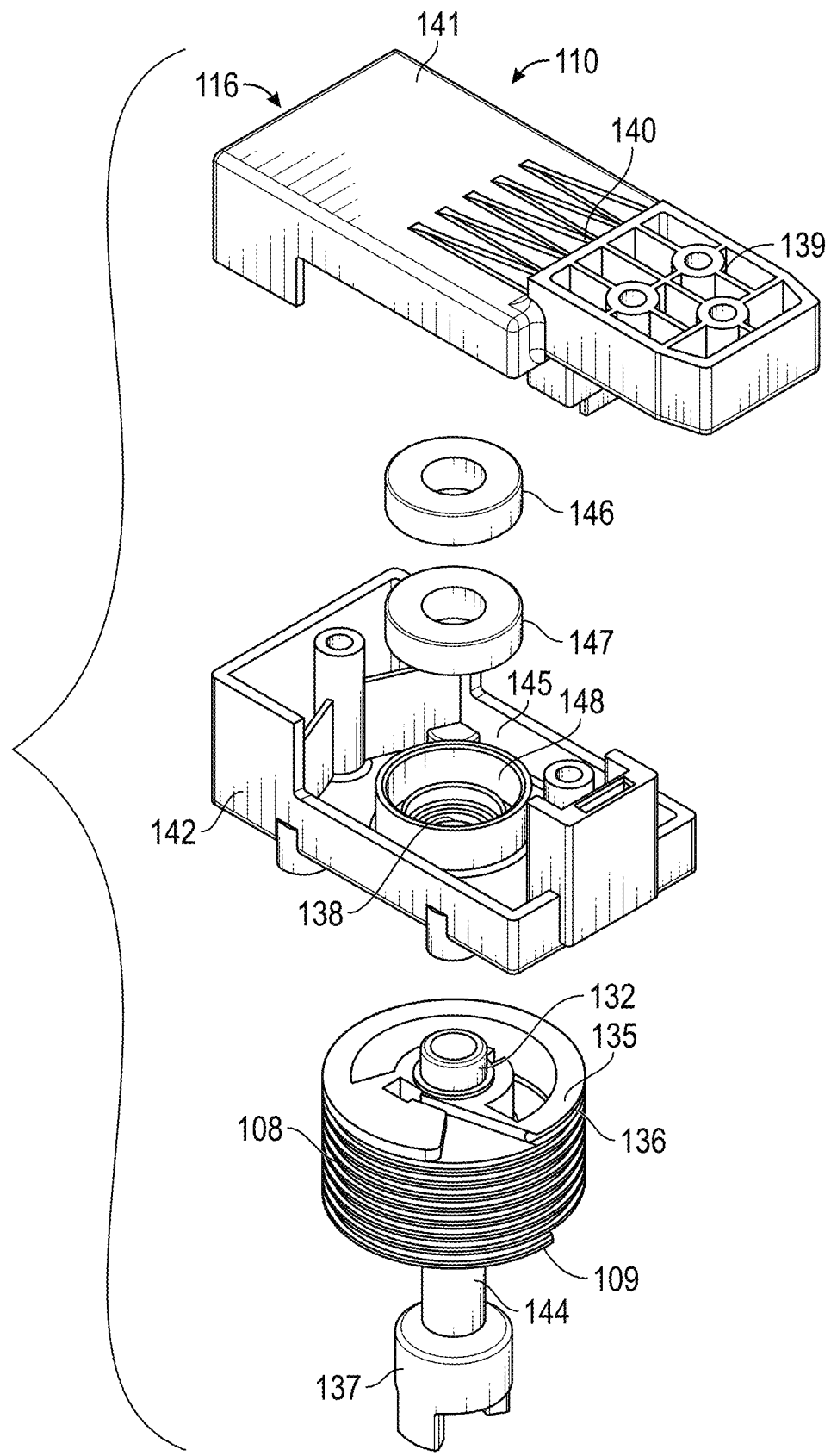
FIG. 16 is an exploded view of the spool drive box of FIG. 15.
Figure 17:
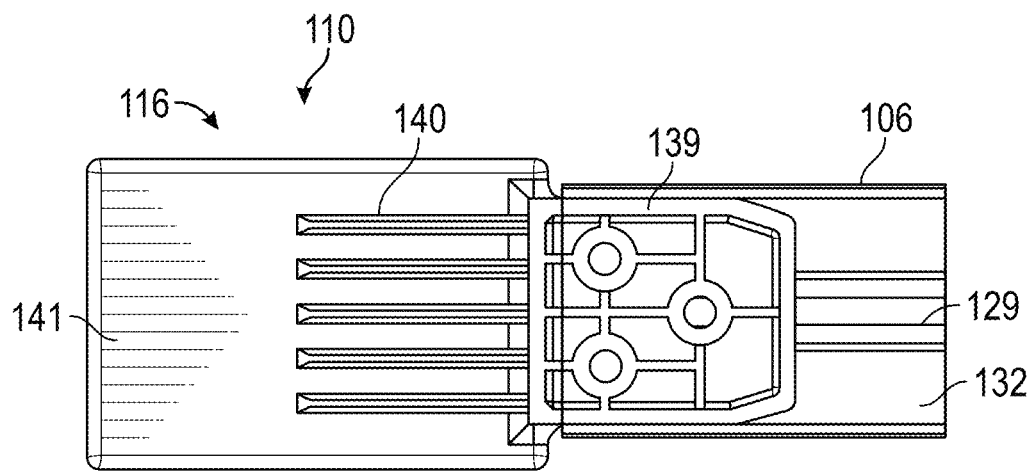
FIG. 17 is a top view of the spool drive box.
Figure 18:
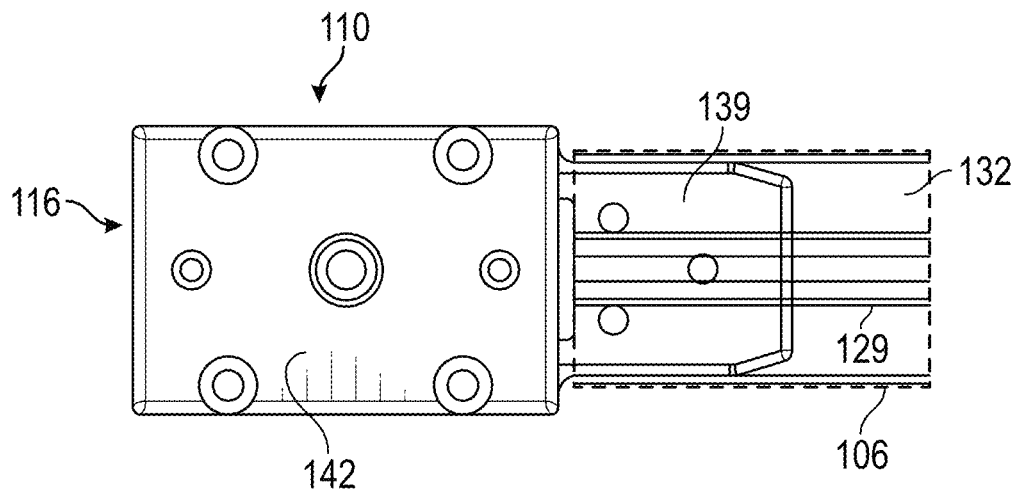
FIG. 18 is a bottom view of the spool drive box.
Figure 19:
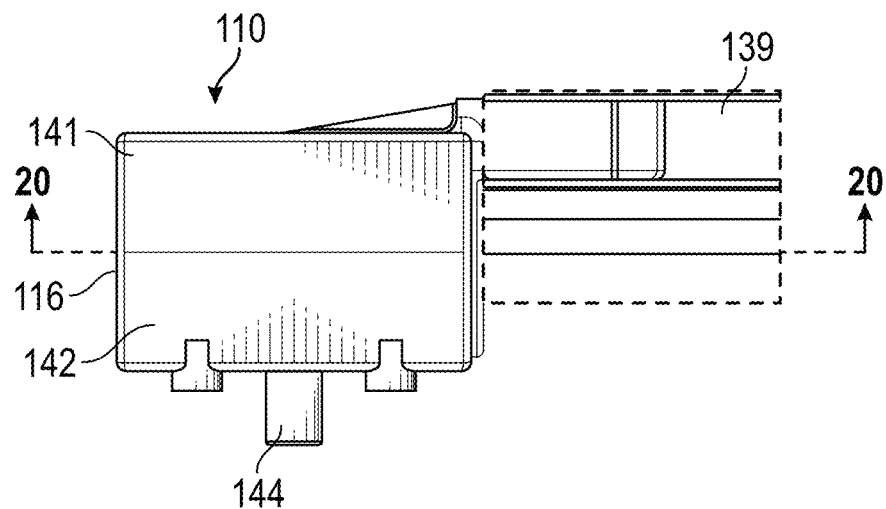
FIG. 19 is a side view of the spool drive box.
Figure 20:
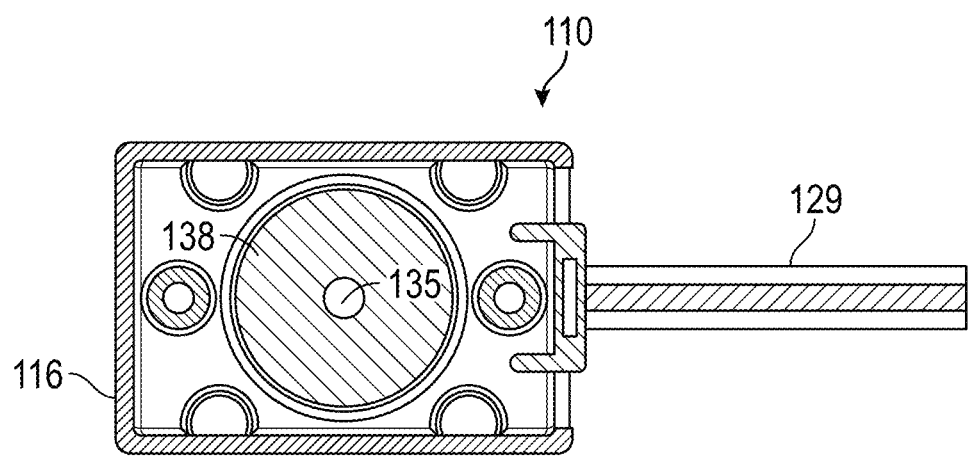
FIG. 20 is a cross-sectional view of the spool drive box taken along line 20-20 of FIG. 19.
Figure 21:
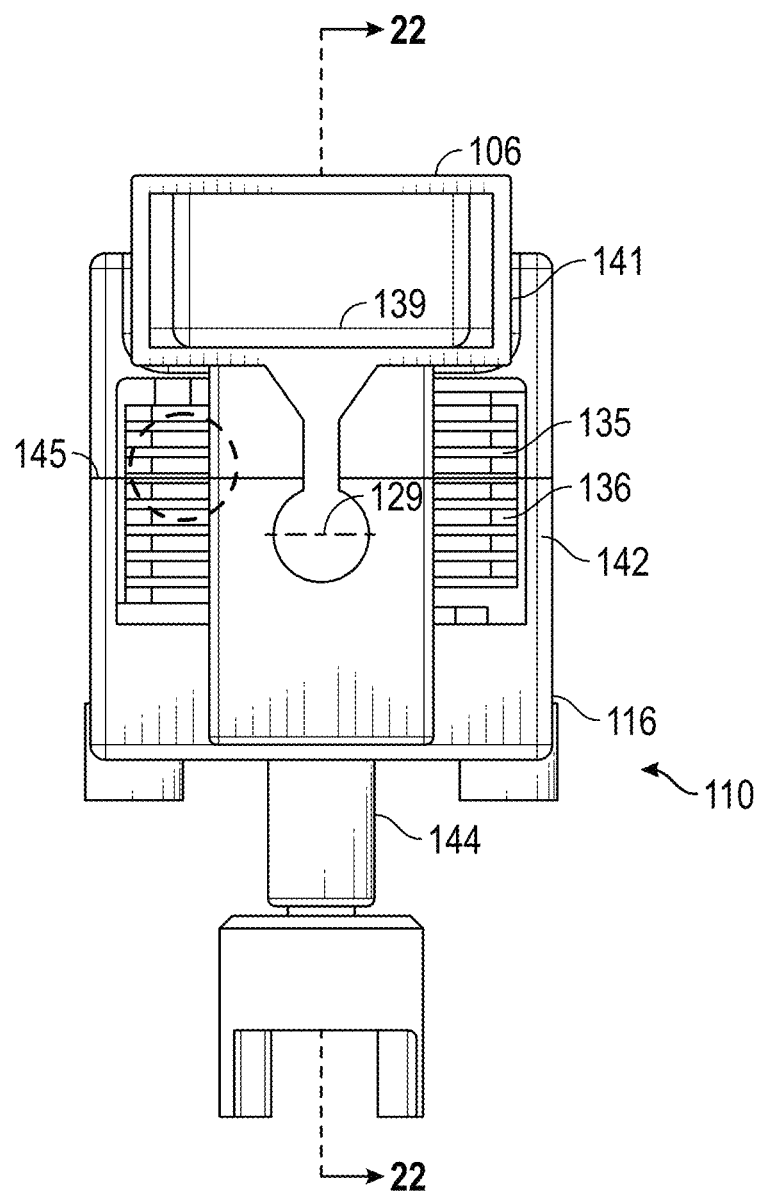
FIG. 21 is an end view of the spool drive box operatively engaged to a linear slide rail.

Referring to FIGS. 15 and 16, in some embodiments the spool drive component 110 includes a spool drive box 116 having an upper casing 141 coupled to a lower casing 142 that collectively defines a cavity 145 configured to receive a spool 135 disposed therein. In some embodiments, the spool 135 includes an axial rod 149 that extends axially from the spool 135 and is coupled to a spline 137 that connects the spline 135 to the drive 114 for rotation by the motor 107 when operating the spool drive component 110. In some embodiments, the lower casing 142 defines a recess 148 in communication with an axial channel 138 formed through the lower casing 142. The recess 148 is configured to receive the bottom portion of the spool 135 such that the axial rod portion 149 extends through the axial channel 138. The spool 135 defines a plurality of helical grooves 136 defined around the peripheral surface of the spool 135 which are configured to receive respective portions of the top cord 108 and bottom cord 109 such that the top cord 108 extends from one portion (e.g. top portion) of the spool 135 and the bottom cord extends from another portion (e.g. bottom portion) of the spool 135. In operation, rotation of the spool 135 in a clockwise direction causes the top cord 108 to be driven in the proximal direction B and the bottom cord 109 to be driven in the distal direction A, while rotation of the spool 135 in the counter-clockwise direction causes the top cord 109 to be driven in the distal direction A and the bottom cord 109 to be driven in the proximal direction B.

Figure 22:
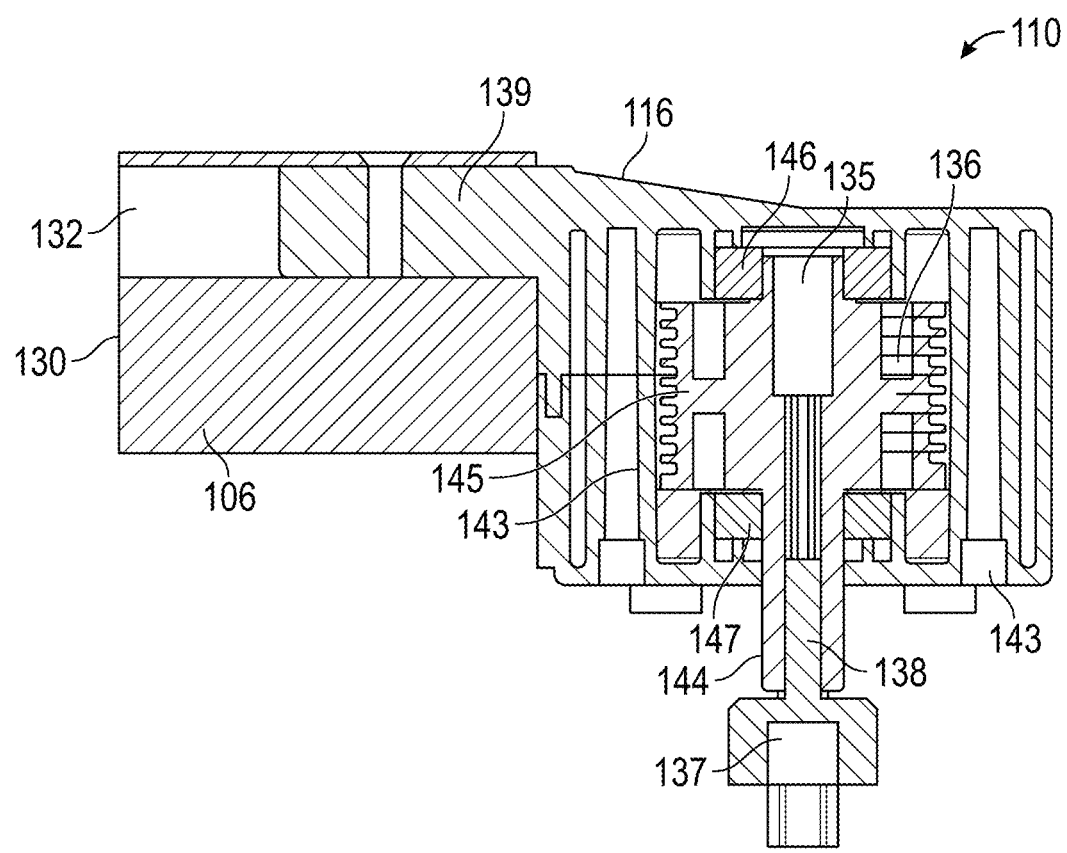
FIG. 22 is a cross-sectional view of the spool drive box taken long line 22-22 of FIG. 21.
Figure 23:
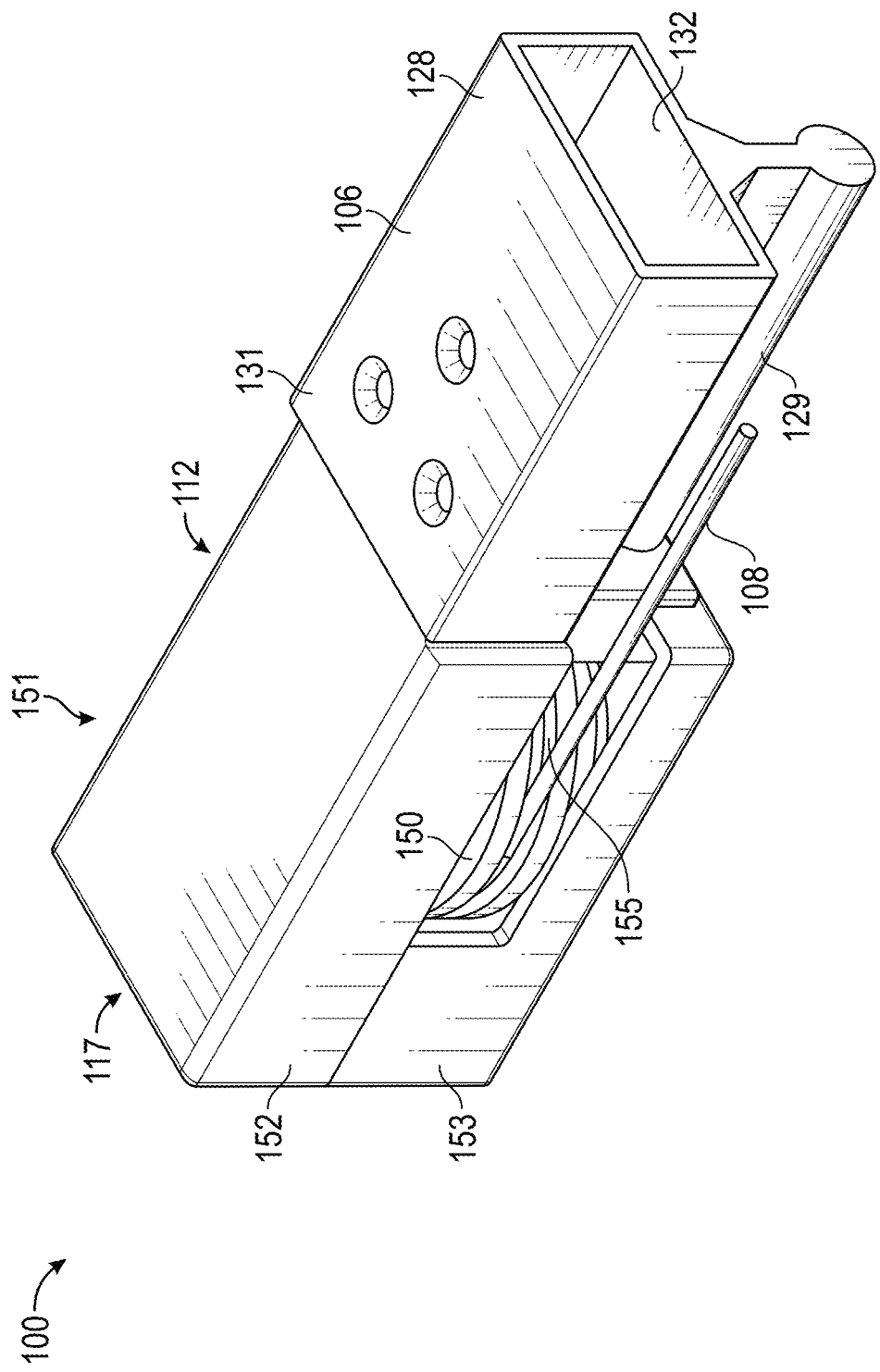
FIG. 23 is a perspective view of the pulley component of FIG. 2.

As shown in FIGS. 16 and 22, the spool drive component 110 may include a first bushing 146 coupled along the top portion of the spool 135 and a second bushing 157 coupled along the bottom portion of the spool 135 when assembled within the spool drive box 116. In some embodiments, the spool drive component 110 is operatively engaged to the motor 107 through the drive 114 (FIG. 31) which is connected to the axial rod portion 149 of the spool 135 through a spline 137 that extends through a channel 138 defined through an extension 144. Operation of the motor 107 causes the spline 137 to rotate the axial rod portion 149 which allows the spool 135, to be rotated in either the clockwise or counter-clockwise direction. As shown in FIG. 22, a plurality of securing members 143 may be used to couple the upper casing 141 to the lower casing 142.

In some embodiments, the upper casing 141 includes a tang 139 that extends outwardly in a lateral direction and configured to be received within the channel 132 through the distal open end 130 of the housing 128 when coupling the spool drive box 116 to the linear slide rail 106. In addition, the upper casing 142 further includes reinforcing ribs 140 that extend from the tang 130 and provide structural reinforcement to the spool drive box 116 and the connection with the linear slide rail 106.

Figure 29:
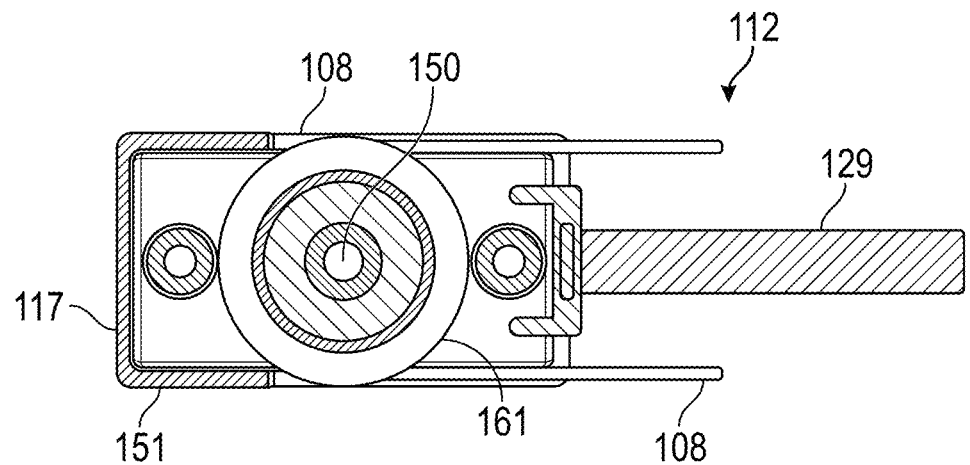
FIG. 29 is a cross-sectional view of the pulley component taken along line 29-29 of FIG. 28.
Figure 30:
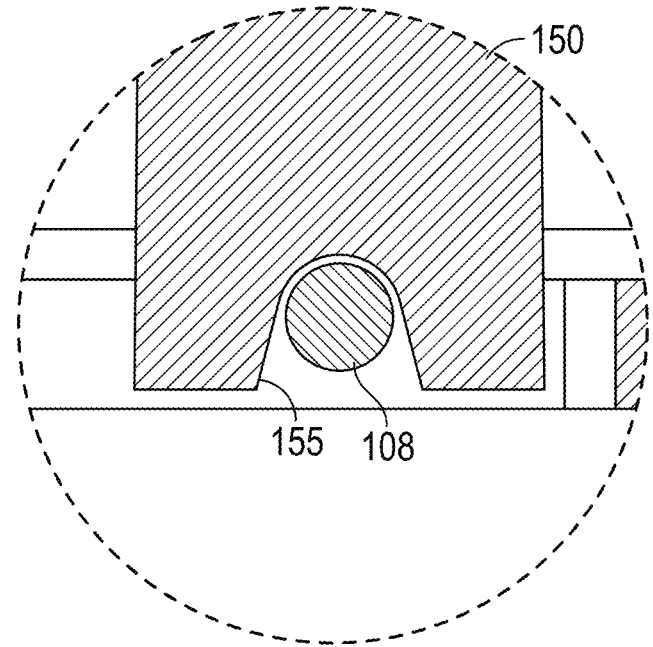
FIG. 30 is an enlarged view of the spool for the pulley component shown in FIG. 26 showing a top cord engaged between the spool drive component and the pulley component.

Referring to FIGS. 23-30, the pulley component 112 includes a pulley box 117 having a housing 151 comprising an upper casing 152 coupled to a lower casing 153 that collectively define a cavity 161 configured to receive a spool 150 disposed therein. As shown in FIG. 30, the spool 150 defines a groove 155 formed around the peripheral edge of the spool 150 which is configured to receive the top cord 108 and allows a sliding engagement between the top cord 108 and the groove 155 when the spool drive component 110 drives the top cord 108. As shown specifically in FIG. 24, the lower casing 153 defines a seat 162 configured to receive the bottom portion of the spool 150 therein and permit the spool 150 to freely rotate about its axis when the top cord 108 is driven by the spool drive component 110. As shown in FIGS. 25-28, the upper casing 152 defines a tang 154 that extends laterally outward and is configured to be received through the proximal open end 131 and disposed within the channel 132 of the linear slide rail 106.

Figure 25:
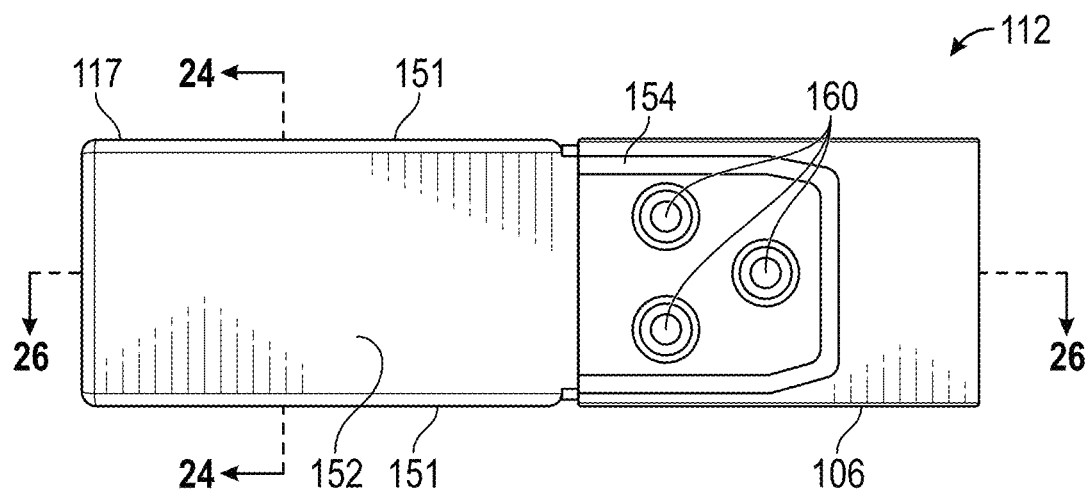
FIG. 25 is a top view of the pulley component.
Figure 26:
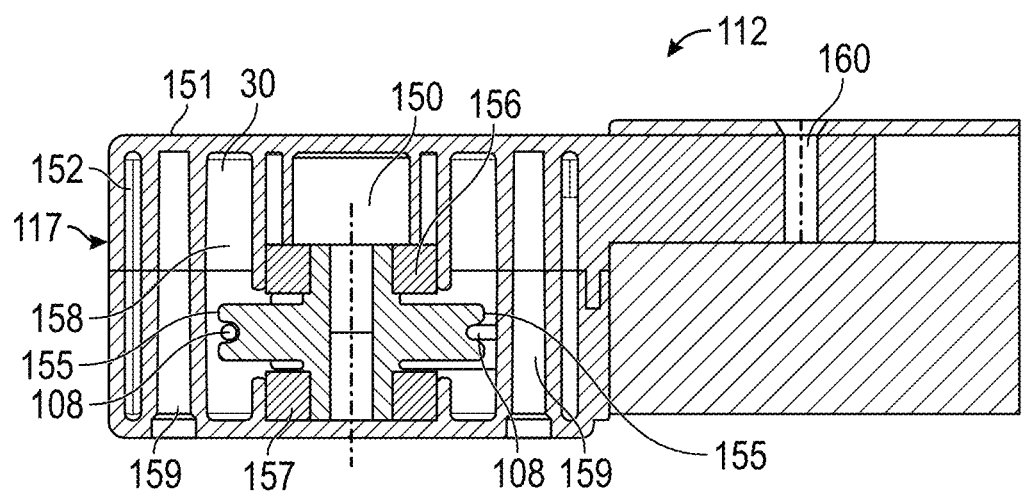
FIG. 26 is a cross-sectional view of the pulley component taken along line 26-26 of FIG. 25.
Figure 27:
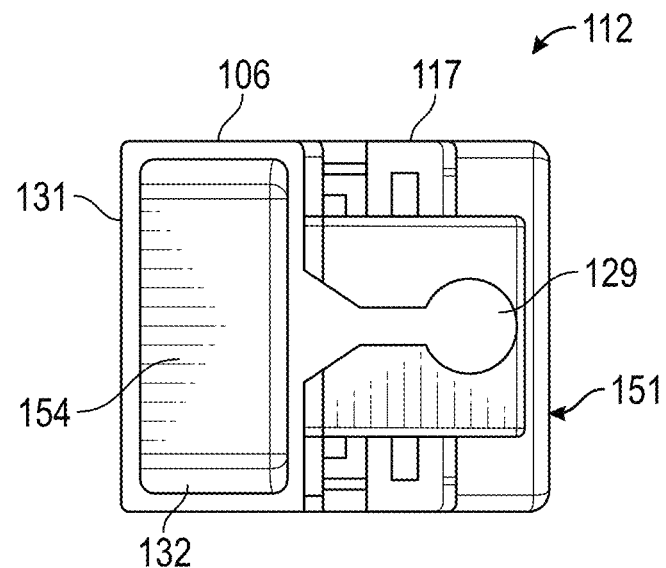
FIG. 27 is an end view of the pulley component engaged to the linear slide rail.
Figure 28:
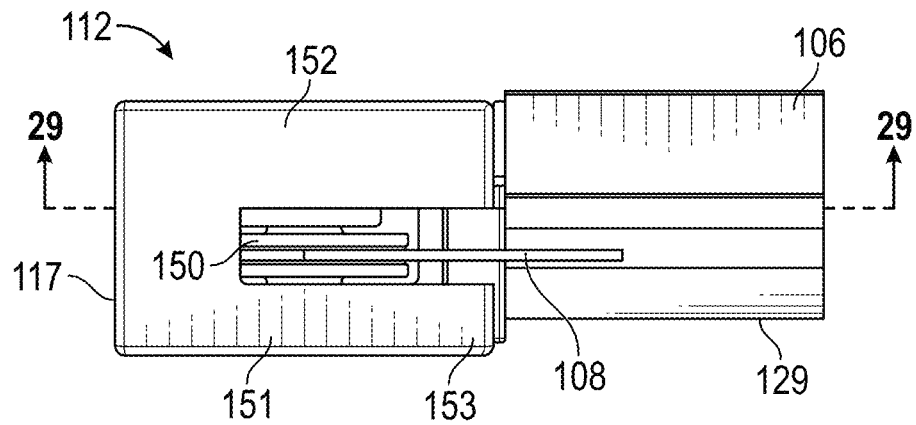
FIG. 28 is a side view of the pulley component engaged to the slide rail.

Referring specifically to FIG. 25, a plurality of securing members 160 may be used to secure the pulley component 112 to the linear slide rail 106 through the tang 154. As shown in FIGS. 25 and 29, a plurality of securing members 159 may be used to secure the upper casing 152 to the lower casing 153 to form the housing 151. When assembled, the pulley component 112 includes a bearing holder 158 disposed within the housing 151 and configured to engage a first bearing 156 positioned above the spool 150 and a second bearing 157 positioned below the spool 150 as illustrated in FIG. 26.

Referring back to FIG. 31, the automatic sliding door system 100 further includes a microprocessor 103 in operative communication with the motor 107 for controlling operation of the drive spool component 110 and the touch panel 164 when an individual desires to actuate the motor 107 through operation of the actuator 113. In some embodiments, the microprocessor 103 is in operative communication with a power source 111 for powering the various components of the automatic sliding door system 100.

In some embodiments, the microprocessor 103 is in operative communication with an encoder 115 for providing feedback data for determining the direction and distance the door panel 102 must travel from a present position of the door panel 102 to the instructed position the door panel 102 is instructed to assume by the encoder 115. In some embodiments, the encoder 115 may include multiple lines of resolution in which each line of resolution represents one of a plurality of possible positions the door panel 102 may be positioned by the slide and rail assembly 104. For example, the encoder 115 may be an optical disc having a 1,000 lines of resolution in which a respective pulse generated from each of the 1,000 lines of resolution equals one detected revolution of the encoder 115 for determining the position and distance of travel of the slide 105.

As noted above, the automatic sliding door system 100 is operable to allow an individual to apply a predetermined amount of pressure along the edge of the sliding door panel 102 to cause the door panel 102 to automatically slide to the open position. In particular, the encoder 115 may be programmed to detect a predetermined amount of pressure being applied to the door panel 102 by an individual such that the encoder 115 causes the motor 107 to move the sliding door panel 102 to the closed position. In operation, the encoder 115 detects the amount of pressure being applied to the sliding door panel 102 due to the slight movement imparted to the sliding door panel 102 as the one or more lines or resolution are energized by a respective pulse generated by movement of the sliding door panel 102. When a certain number of lines of resolution of the encoder 115 are energized, the encoder 115 causes the sliding door panel 102 to move to the open position. As such, the encoder 115 may be programmed to move the sliding door panel 102 to the closed position when the amount of pressure applied to the edge of the sliding door panel 102 is equal to a predetermined number of lines of resolution being energized in the encoder 115 due to the detected movement of the sliding door panel 102.

In addition, the microprocessor 103 may operate software that allows the automatic sliding door system 100 to adjust the amount of force required to actuate and slide the sliding door panel 102 in instances when an individual applies pressure directly to the sliding door panel 102.

Figure 33:
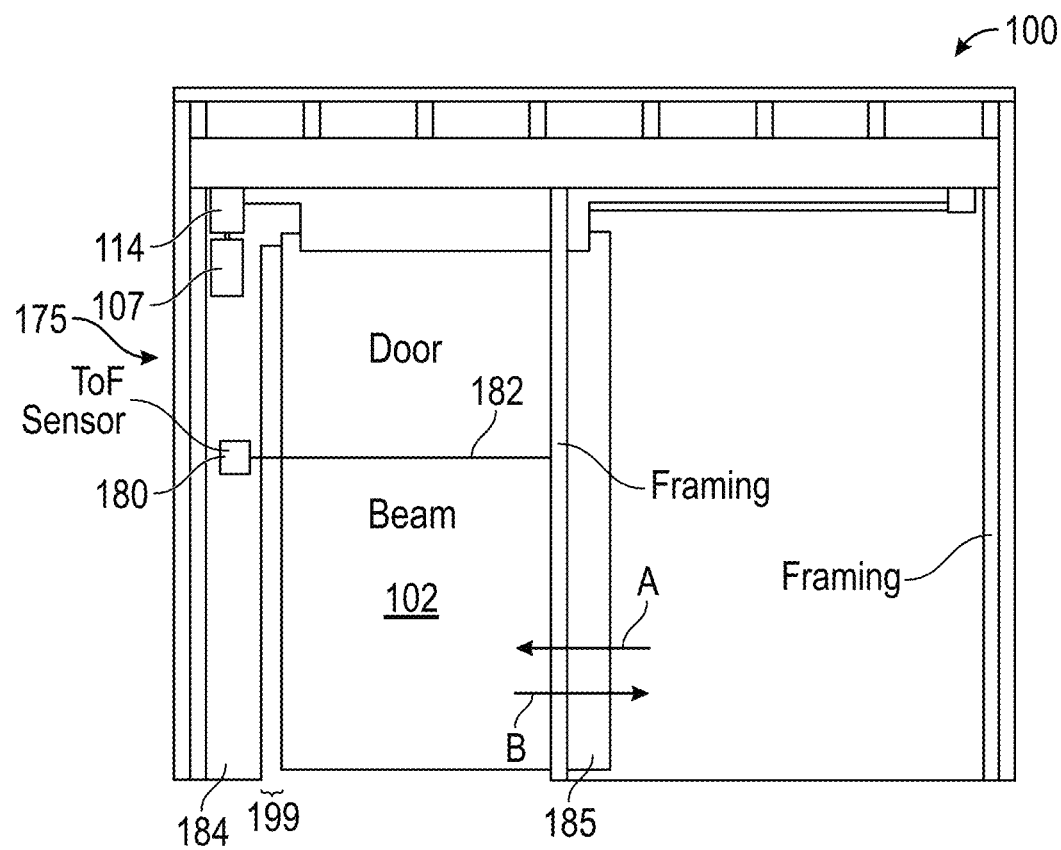
FIG. 33 is a simplified illustration of an automatic sliding door with a kinematic control system that permits kinetic control of the sliding door without physical contact.
Figure 34:
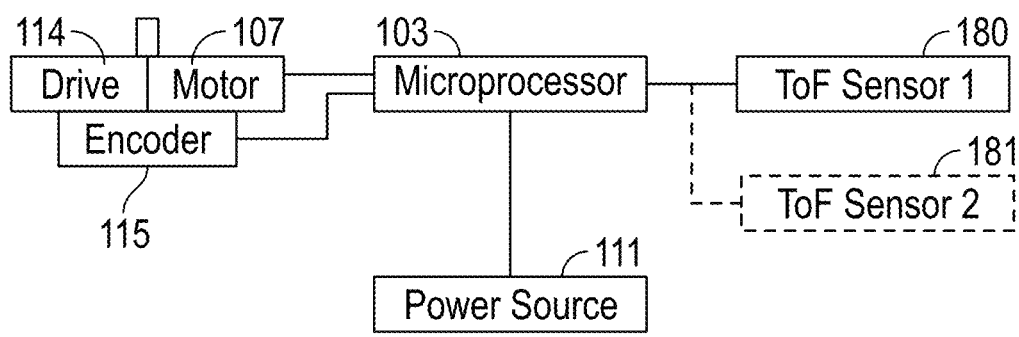
FIG. 34 is a simplified block diagram of the kinematic control system.

Referring to FIGS. 33-41, in some embodiments a kinematic control system 175 is operable for controlling the operation and movement of the sliding door panel 102 of the automatic sliding door system 100 using one or more hand gestures or motions without any physical contact. Referring specifically to FIGS. 33 and 34, in some embodiments the kinematic control system 175 includes one or more time-of-flight sensors 180 positioned along a frame 184 positioned on one side of a frame 184 that transmits a light beam 182 across an opening of the sliding door panel 102 to frame 185 positioned on the opposite side of frame 184 and is operable to detect a target 190, for example a user's hand, that interrupts the path of the light beam 182 for controlling the movement of the sliding door panel 102.

Figure 24:
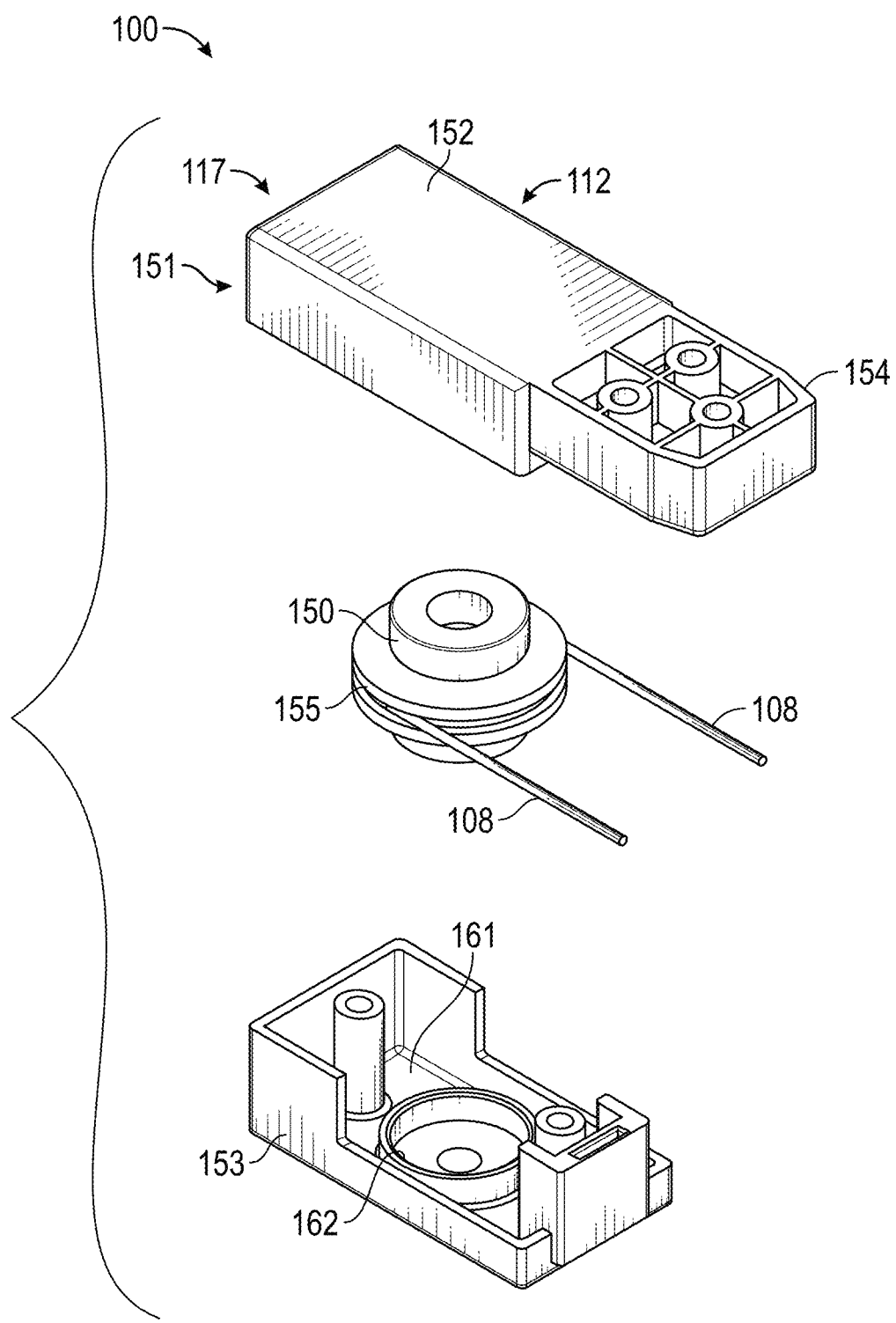
FIG. 24 is an exploded view of the pulley component of FIG. 23.
Figure 35:
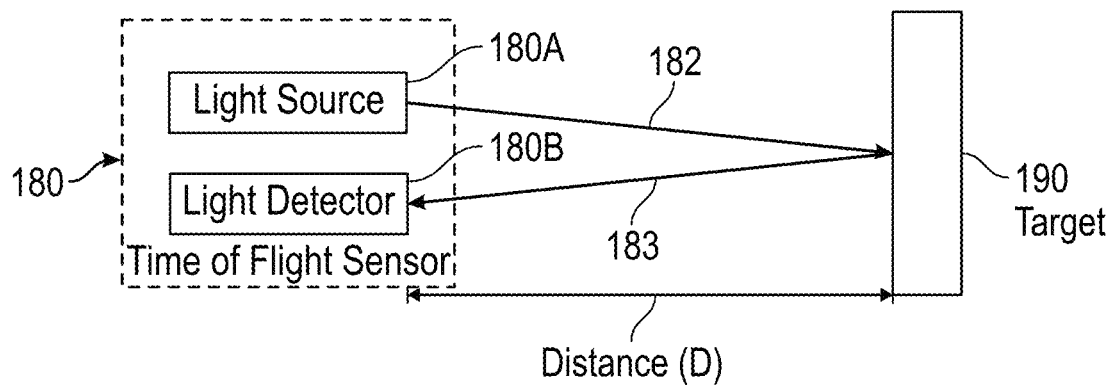
FIG. 35 is a simplified illustration showing the operation of a time-of-flight sensor used with the kinematic control system.

As shown in FIGS. 24 and 35, the time-of-flight sensor 180 is in operative communication with the microprocessor 103 for providing data related to measuring the time it takes the light beam 182 transmitted by a light source 180A to travel from the time-of-flight sensor 180 to a target 190, such as frame 184 or a hand of a user, and back to a detector 180B of the time-of-flight sensor 180. As noted above, the microprocessor 103 is also in operative communication with the encoder 115 that provides feedback data for determining the direction and distance the sliding door panel 102 must travel from a present position of the sliding door panel 102 to the instructed position of the sliding door panel 102. In addition, a power source 111 provides power to the microprocessor 103.

In one method of using the time-of-flight sensor 180 to control the movement of the sliding door panel 102 by the kinematic control system 175, the absolute time required for the transmitted pulse of the light beam 182 to travel from the light source 180A, reflect off the target, and be detected by the light detector 180B is measured. The microprocessor 103 calculates the total distance (D) (FIG. 35) as D=½*D*c, wherein c represents the speed of light in air.

In another method of using the time-of-flight sensor 180 to control the movement of the sliding door panel 102, involves using interferometry. As in the first method noted above, a pulse of light beam 182 is emitted from the light source 180A, reflects off the target 190 (e.g., frame 184 or the user's hand) and is detected by the light detector 180B. However, in contrast to the first method noted above, this particular method measures the difference in phase of the emitted light beam 182 to the phase of the reflected light beam 182 such that the difference in phase is directly proportional to the absolute distance (D) traveled by the light beam 182.

As shown in FIG. 34, in some embodiments a second time-of-flight sensor 181 is provided in combination with the time-of-flight sensor 180 to determine distance (D) a shall be discussed in greater detail below.

In one aspect, it is contemplated that the kinematic control system 175 may control the operation and movement of a sliding window (FIG. 36), rather than the sliding door panel 102, without departing from the scope of the present disclosure.

As noted above, the operation and movement of the sliding door panel 102 may be manipulated by placing a hand in the path of the light beam 182 and performing various hand gestures and/or motions to control the movement of the sliding door panel 102 as shall be discussed in greater detail.

In some embodiments, the microprocessor 103 may execute instructions related to an algorithm that allows a user to control movement of the sliding door panel 102 by detecting and measuring the user's hand position relative to the sliding door frame 102 as well as frames 184 and 185 by the time-of-flight sensor 180. In general, the microprocessor 103 executes an Algorithm 1 to operate the sliding door panel 102 when the user breaks the light beam 182 transmitted by the time-of-flight sensor 180 with their hand motion and then allow the sliding door panel 102 to fully open, fully close, lock and unlock, and/or follow the movement of the user's hand. In some embodiments, the microprocessor 103 does prevents the sliding door panel 102 from moving if the light beam 182 is interrupted by the user's hand motion outside a defined boundary for kinematic control of the sliding door panel 102, referred to herein as an "invisible handle". The flow logic of Algorithm 1 is set forth below.

```
HANDLE_TOLERANCE = constant or adjustable position tolerance
START:
    CALL CALIBRATE //Measures OPENING_WIDTH
    STATE = IDLE
DO
    //Determine if beam is interrupted
    IF (D < OPENING_WIDTH - BEAM _ TOLERANCE) THEN
    //Check if hand is within tolerance of "invisible handle"
    IF (ABS(D - X) < HANDLE_TOLERANCE/2 OR STAT =
    FOLLOWING
THEN
    SET X = D //Command door to same position as hand
    ENDIF
ELSE
    //Stop movement when hand is removed from the beam
    STATE = IDLE
    ENDIF
LOOP
```

Figure 36:
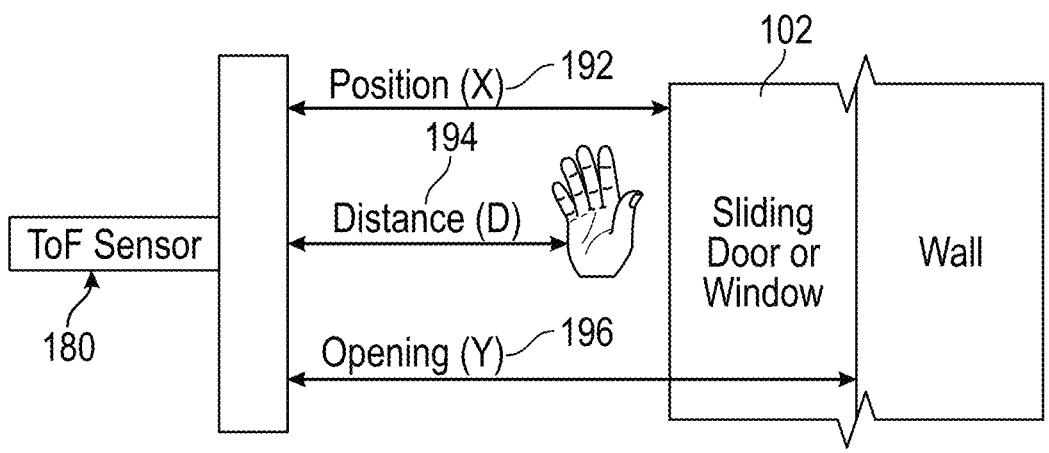
FIG. 36 is a simplified illustration showing variables related to an calibration algorithm for determining the initial physical condition of the sliding door or sliding window panel using the kinematic control system.

As shown in FIG. 36, in general the microprocessor 103 instructs the time-of-flight sensor 180 to determine the distance (D) of the hand as it interrupts the light beam 182, the position (X) of the sliding door panel 102 (or sliding window) at the time the hand interrupts the light beam 182, and the distance (Y) between the time-of-flight sensor 180 and frame 185. In Algorithm 1, the handle tolerance of the kinematic control system 175 is set at constant or at an adjustable position tolerance, as desired. A calibration algorithm is then executed by microprocessor 103 to determine the initial physical condition of the sliding door panel 102 (or sliding window), such as the length of a widening distance 199 between the sliding door panel 102 and the frame 184 or whether the sliding door panel 102 is in a fully closed position or a fully open position. One embodiment of the calibration algorithm is set forth below.

```
MAX_OPENING = maximum supported opening
MIN_OPENING = smallest supported opening
ROUTINE CALIBRATE:
    REPEAT
        READ D
    WHILE (Y < MIN_OPENING) OR (Y> MAX_OPENING)
    OPENING_WIDTH = Y
END ROUTINE
```

After the calibration algorithm is executed, the microprocessor 103 determines whether the light beam 182 of the time-of-flight sensor 180 has been interrupted, for example by the hand motion of the user, and if so, whether the distance (D) is less than the opening distance 199, which is defined as the distance between the sliding door panel 102 and the frame 184, if any. The microprocessor 103 then checks whether the hand motion is within a tolerance distance of the invisible handle if a hand following action by the sliding door panel 102 is initiated by determining if the absolute distance (D-X) is less than the handle tolerance divided by two or the state=following and the state is set at hand following action and X=D. The microprocessor 103 then instructs the motor 107 and drive 114 to move the sliding door panel 102 according to the movement of the user's hand motion.

Figure 37:
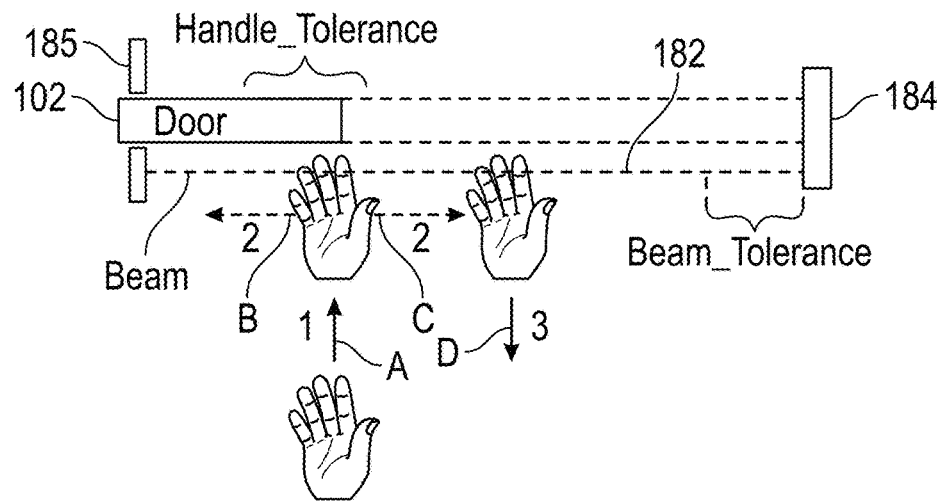
FIG. 37 is a simplified illustration showing the various hand motions that may be used for controlling the operation of the automatic sliding door panel using the kinematic control system.

As illustrated in FIG. 37, actuation of the sliding door panel 102 in a hand following action may be accomplished by the user first inserting their hand within a specifically defined area along the pathway of the light beam 182 such that interruption of the light beam 182 only along that specific area of the light beam's 105 path causes movement of the sliding door panel 102 to follow the hand movement. In other words, the hand motions of the user must fall within the tolerance levels set for both the invisible handle and the light beam 182 to move the sliding door panel 102 hand following action. For example, the user may direct their hand in direction A until the hand interrupts the light beam 182 within the boundary of the invisible handle and then moves their hand in either the B or C lateral direction to cause the sliding door panel 182 to move in those lateral directions. The user may then terminate movement of the sliding door panel 102 by withdrawing the hand from the light beam 182 in opposite direction D such that the light beam 182 is no longer interrupted.

Figure 38A:
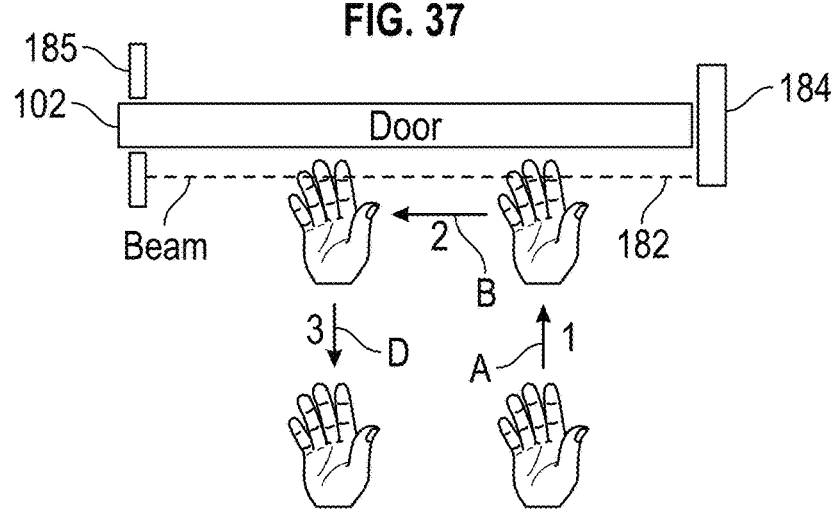
FIG. 38A is a simplified illustration showing hand motions used for opening the automatic sliding door panel by the kinematic control system.

Referring to FIG. 38A, in one embodiment the user may use a hand gesture to fully open a closed sliding door panel 102 by directing their hand in direction A until the path of the light beam 182 is interrupted and then the user moves their hand in lateral direction B as if opening a sliding door to cause the sliding door panel 102 to physically open when instructed by microprocessor 103. Finally, the user removes their hand from the light beam 182 along direction D after the sliding door panel 102 is completely open.

Figure 38B:
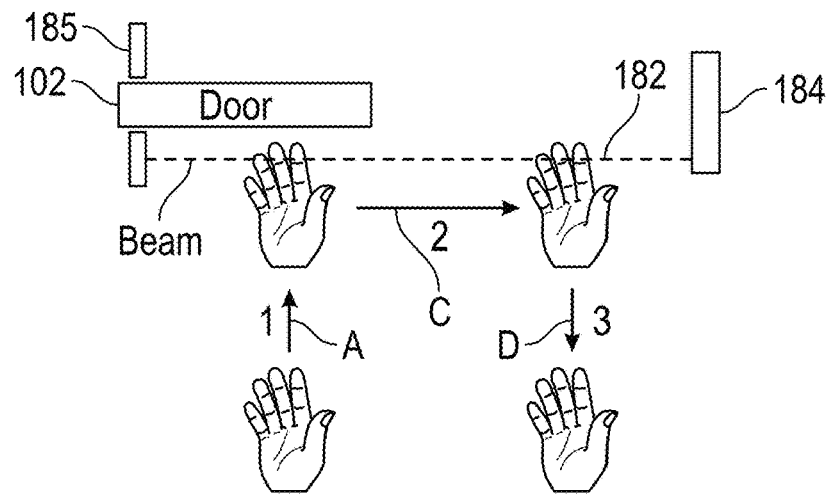
FIG. 38B is a simplified illustration showing hand motions used for closing the automatic sliding door panel by the kinematic control system.

Referring to FIG. 38B, in one embodiment the user may use a hand gesture to close an open sliding door panel 102 by directing their hand in direction A until the path of the light beam 182 is interrupted and then move their hand in lateral direction C as if closing a sliding door to cause the sliding door panel 102 to physically close. Finally, the user removes their hand from the light beam 182 along direction D after the sliding door panel 102 is completely closed.

Figure 39A:
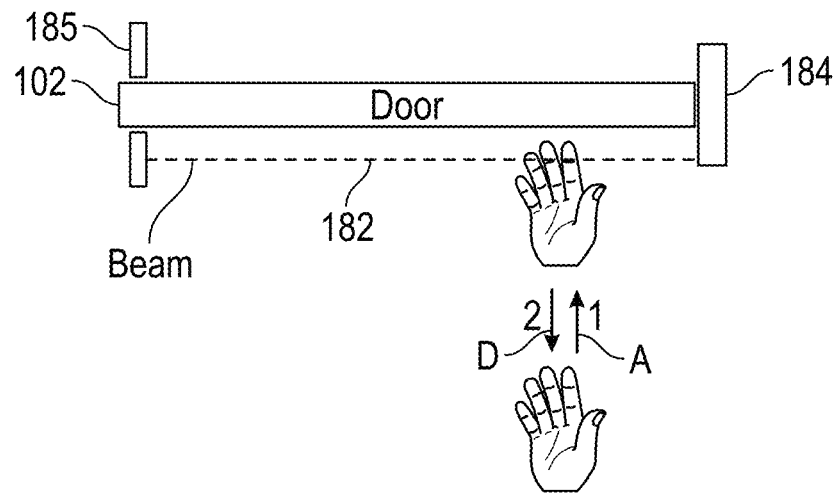
FIG. 39A is a simplified illustration showing hand motions used for locking the automatic sliding door panel by the kinematic control system.
Figure 39B:
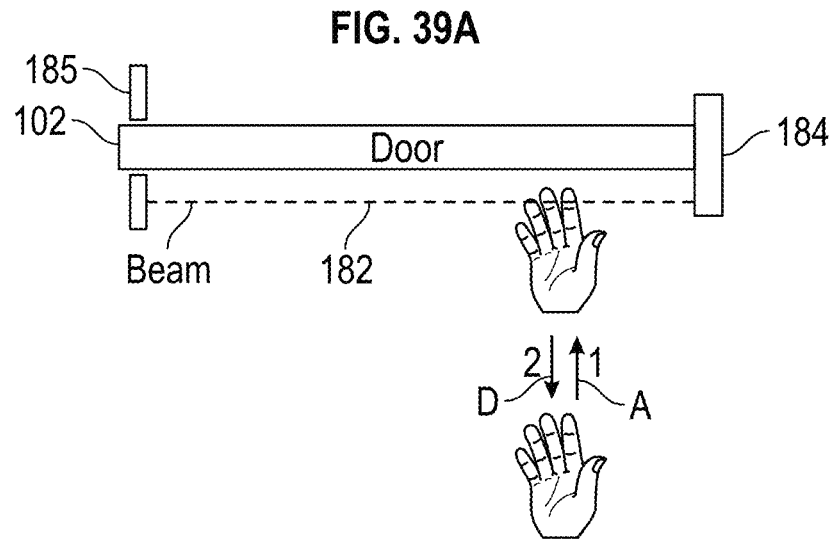
FIG. 39B is a simplified illustration showing hand motions for unlocking the automatic sliding door panel by the kinematic control system.

FIGS. 39A and 39B illustrate the manner in which the sliding door panel 102 is locked and unlocked. As shown in FIG. 39A, with the sliding door panel 102 fully closed and unlocked, the user directs their hand in direction A to interrupt the light beam 182 anywhere along the pathway. Then, without moving the hand laterally, the user removes their hand from the laser beam 182 in direction D to lock the sliding door panel 102. Conversely, as shown in FIG. 39B, with the sliding door panel 102 completely closed and locked, the user directs their hand again in direction A to interrupt the light beam 182 anywhere along its path. Then without moving the hand laterally, the user removes their hand from the path of the laser beam 182 in direction D to unlock the sliding door panel 102.

Figure 40A:
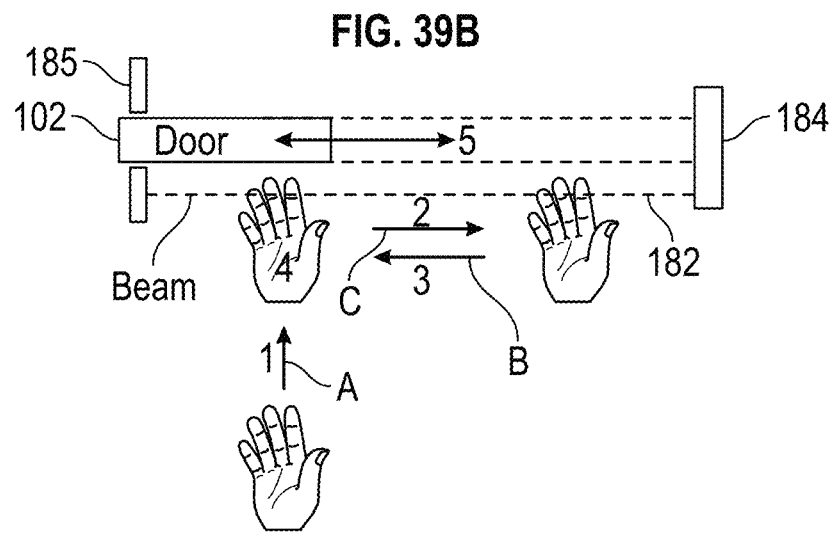
FIG. 40A is a simplified illustration showing hand motions used for instructing the automatic sliding door panel to follow a hand gesture by the kinematic control system.
Figure 40B:
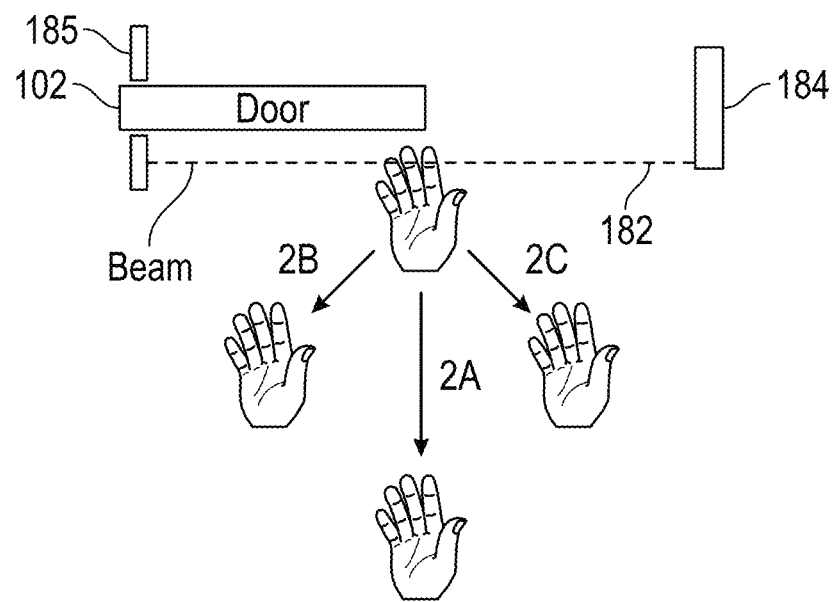
FIG. 40B is a simplified illustration showing hand motions for the instructing the automatic sliding door panel to stop terminate the hand following action.
Figure 41:
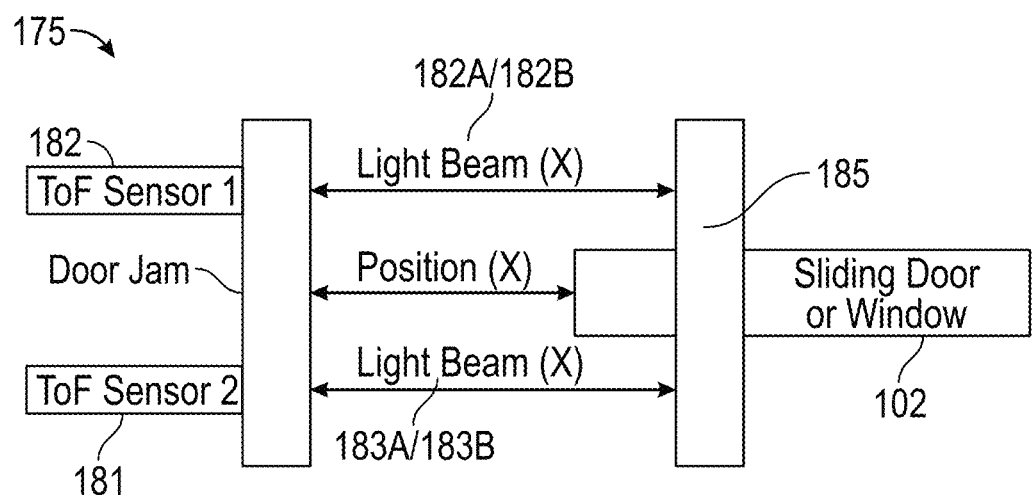
FIG. 41 is a simplified block diagram showing an embodiment of the kinematic control system having a multiple sensor arrangement.

FIGS. 40A and 40B illustrate the manner in which the user may control the movement of the sliding door panel 102 in a hand following action discussed above such that the sliding door panel 102 follows the hand motion of the user after the laser beam 182 has been interrupted. As shown in FIG. 40A, with the sliding door panel 102 in any position, the user directs their hand in direction A to interrupt the light beam 182 anywhere along its path. The user then moves their hand rapidly in either lateral direction B ("open" direction) or directions C ("closed" direction), whichever is the opposite of the current state (open or closed) of the sliding door panel 102. The user then moves their hand rapidly back the same lateral distance in direction B (open position) and holds their hand in that same position for a short delay. The sliding door panel 102 will then move in the lateral direction that the user's hand moves in a hand following action. In this manner, the invisible handle being manipulated by the user is in-line with the user's hand as the sliding door panel 102 follows the user's hand motion. Accordingly, the microprocessor 103 executes the Algorithm 1 discussed above to provide the hand following action to the sliding door panel 102 illustrated in FIG. 40A.

As shown in FIG. 40B, as the sliding door panel 102 follows the user's hand motion, the user may terminate the hand following action by rapidly moving their hand out of the path of the light beam 182 while also moving their hand in either in a perpendicular direction 2A relative to the sliding door panel 102 (opening or closing directions). In some embodiments, if the hand motion is perpendicular to the sliding door panel 102 in direction 2A, the sliding door panel 102 remains stationary; however, if the hand motion is in direction 2B the sliding door panel 102 moves to the fully open position or hand motion in direction 2C the sliding door panel 102 moves to the fully closed position.

As noted above and shown in FIG. 41, in some embodiments, the kinematic control system 175 may include a pair of time-of-flight sensors 181 and 182 in which time-of-flight sensor 181 is positioned to the interior of the sliding door panel 102 and time-of-flight sensor 182 is positioned to the exterior of the sliding door panel 102, or vice versa. By positioning the time-of-flight sensors 181 and 182 on the respective exterior and interior sides of the sliding door panel 102, a user may interact with either time-of-flight sensor 181 or 182 individually using any of the aforementioned methods of use. In addition, by detecting the order in which the respective light beams 105 are interrupted will allow the microprocessor 103 to determine the direction the user traveled through the sliding door panel 102.

In one aspect, the kinematic control system 175 may sum the number of ingress of egress events as one or more individuals pass through the sliding door panel 102.

In another aspect, the kinematic control system 175 may record the occupancy count based on the ingress and egress such that the microprocessor 103 can command the sliding door panel to perform certain action (open or close) based on room occupancy.

In yet another aspect, the kinematic control system 175 may control the movement of any type of sliding panel, for example sliding door or window panels; however, the present disclosure is not limited in this regard.

Jamb Transition

Because the handle of the sliding door panel 102 could be inside the wall when the sliding door panel 102 is fully open, the algorithm allows the sliding door panel 102 to begin following the users hand and then the invisible handle catches up to the position of their hand.

Pinch Protection

When the sliding door panel 102 is following the user's hand, the microprocessor 103 checks to verify that the user's hand is not past the physical location of the invisible handle when it gets close to the fully closed position. If the user's hand passes the invisible handle when almost closed, the sliding door panel 102 will stop until the user removes their hand from the beam or moves it back to the invisible handle.

Figure 42A:
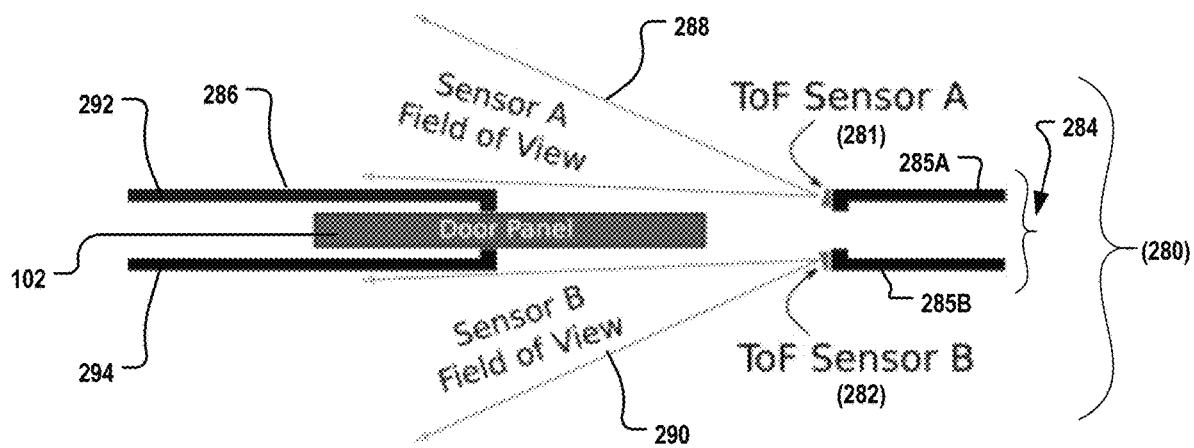
FIG. 42A is a simplified illustration showing an embodiment of the kinematic control system with a first sensor placement option.
Figure 42B:
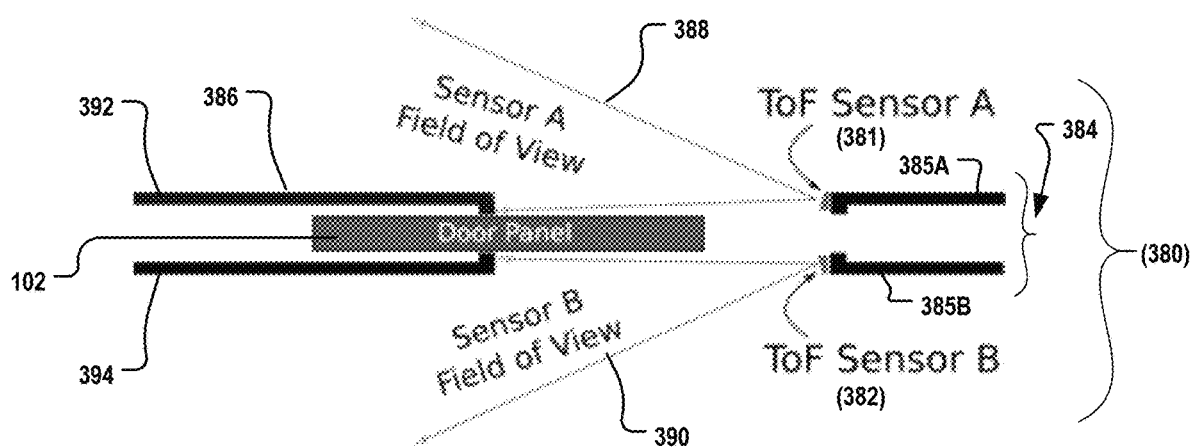
FIG. 42B is a simplified illustration showing an embodiment of the kinematic control system with a second sensor placement option.

Referring to FIGS. 42A-42B, in some embodiments, the ToF sensors described herein may be implemented according to one or more different sensor placement and orientation options. For example, referring to a first sensor placement option illustrated in FIG. 42A, a kinematic control system 275, similar to the kinematic control system 175, may be implemented and operable for controlling the operation and movement of the sliding door panel 102 of the automatic sliding door system 100 using one or more hand gestures or motions without any physical contact as previously described. As indicated, the kinematic control system 275 includes one or more time-of-flight (ToF) sensors 280, designated ToF sensor A (281) and ToF sensor B (282)

positioned along a frame 284 as indicated. In particular, the ToF sensor A 281 may be positioned along an interior portion 285A of the frame 284 opposite a door jamb 286, and the ToF sensor B 282 may be positioned along an exterior portion 285B of the frame 284 opposite the door jamb 286, or vice versa. In some embodiments, the ToF sensors 280 may comprise long distance ranging ToF sensors by STMicroeletronics, model no. VL53L1X configured to generate ranging data, but the present disclosure is not limited in this regard.

In this embodiment, as indicated, the ToF sensor A 281 may be angled or otherwise oriented along the interior portion 285A of the frame 284 in such a manner as to define a field of view 288 that extends outside the door jamb 286 and door panel 102. In other words, the field of view 288 of the ToF sensor A 281 extends around and terminates outside a first side 292 of the door jamb 286 such that the field of view 288 does not include the door panel 102 and the door jamb 286.

Similarly, the ToF sensor B 282 may be angled or otherwise oriented along the exterior portion 285B of the frame 284 in such a manner as to define a field of view 290 that extends outside the door jamb 286 and door panel 102. In other words, the field of view 290 of the ToF sensor B 282 extends around and terminates outside a second side 294 of the door jamb 286 such that the field of view 290 does not include the door panel 102 and the door jamb 286.

The field of view 288 and the field of view 290 are the areas in which the ToF sensor A 281 and the ToF sensor B 282 respectively measure the distance to a most reflective object (not shown). By excluding the door jamb 286 and the door panel 102 in this embodiment, different algorithms or computations can be used to operate the system 100.

Referring to FIG. 42B, second sensor placement option is contemplated. In this embodiment, a kinematic control system 375, similar to the kinematic control system 175 and the kinematic control system 275, may be implemented and operable for controlling the operation and movement of the sliding door panel 102 of the automatic sliding door system 100 using one or more hand gestures or motions without any physical contact. As indicated, the kinematic control system 375 includes one or more time-of-flight (ToF) sensors 380, designated ToF sensor A (381) and ToF sensor B (382) positioned along a frame 384 as indicated. In particular, the ToF sensor A 381 may be positioned along an interior portion 385A of the frame 384 opposite a door jamb 386, and the ToF sensor B 382 may be positioned along an exterior portion 385B of the frame 384 opposite the door jamb 386, or vice versa. In some embodiments, the ToF sensors 380 may comprise long distance ranging ToF sensors by STMicroeletronics, model no. VL53L1X configured to generate ranging data, but the present disclosure is not limited in this regard.

In this embodiment, as indicated, the ToF sensor A 381 may be angled or otherwise oriented along the interior portion 385A of the frame 384 in such a manner as to define a field of view 388 that at least partially intersects or encompasses the door jamb 386. In other words, the field of view 388 of the ToF sensor A 381 extends at least partially between a first side 392 of the door jamb 386 and the door panel 102 such that the field of view 388 includes the door jamb 386.

Similarly, the ToF sensor B 382 may be angled or otherwise oriented along the exterior portion 385B of the frame 384 in such a manner as to define a field of view 390 that at least partially intersects or encompasses the door jamb 386. In other words, the field of view 390 of the ToF sensor B 382 extends at least partially between a second side 394 of the door jamb 386 and the door panel 102 such that the field of view 390 includes the door jamb 386.

The field of view 388 and the field of view 390 are the areas in which the ToF sensor A 381 and the ToF sensor B 382 respectively measure the distance to a most reflective object (not shown). By including the door jamb 386 in this embodiment, different algorithms or computations can be used to operate the system 100.

In some embodiments, any of the ToF sensors 280 or the ToF sensors 380 are operable (via instructions from a processor or otherwise) to modify the fields of view shown programmatically. For example, instructions may be transmitted to the ToF sensors 280 or the ToF sensors 380 by e.g., a processor, to adjust any of the fields of view by programmatically selecting predetermined regions of interest proximate to the door jamb 286 or the door jamb 386. More specifically for example, the ToF sensors 280 may include one or more of a single-photon avalanche diode (SPAD) array defining 16×16 SPADs which cover the full field of view (FoV); and it is possible to program a smaller region of interest (ROI), with a smaller number of SPADs, to reduce or modify the FoV. To set an ROI different than the default 16×16 one, a user can call e.g., a function such as a VL53L1_SetUserROI( ) function. The ROI may be a square or rectangle defined by two corners: top left and bottom right.

Four coordinates are used to localize these two corners on the full SPAD array:
TopLeftX
TopLeftY
BotRightX
BotRightY These coordinate parameters are specific to the VL53L1_UserRoi_t structure included within the software available to the non-limiting STMicroeletronics ToF sensors referenced above, model no. VL53L1X (which may be used as the ToF sensors but the present disclosure is not limited in this regard). The user may then define the ROI coordinate values in the structure, and call a driver function to apply the ROI change. An example of an ROI setting for programmatically modifying the field of views is shown in FIG. 43.

Figure 43:
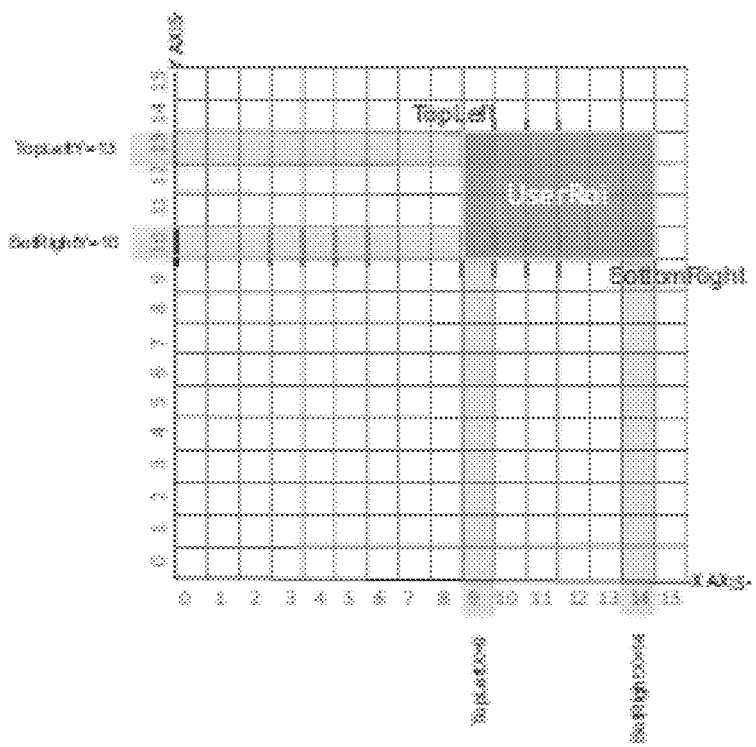
FIG. 43 is an example ROI setting for adjusting the field of view of the ToF sensors.

Referring to FIG. 43, the VL53L1_UserRoi_t structure contains the coordinates of an ROI:
TopLeftX: 8 bit integer that gives the top left x coordinate [0;15]
TopLeftY: 8 bit integer that gives the top left y coordinate [0;15]
BotRightX: 8 bit integer that gives the bottom right x coordinate [0;15]
BotRightY: 8 bit integer that gives the bottom right x coordinate [0;15]

One example to set one ROI (based on FIG. 43) is given as follows:

```
VL53L1_UserRoi_t roiConfig;
roiConfig.TopLeftX = 9;
roiConfig.TopLeftY = 13;
roiConfig.BotRightX = 14;
roiConfig.BotRightY = 10;
status = VL53L1_SetUserROI(&VL53L1Dev, &roiConfig);
```

By placing a ToF sensor along both sides of the door frame as described above, algorithms associated with hand gestures as described can be more robust at discerning the difference between a person walking through a door as compared with a gesture. For example, a person walking between the frame 284 and the jamb 286 of the kinematic control system 275 would pass through both fields of view 288 and 290 and interrupt both ToF sensors 280, whereas a gesture as described herein would only interrupt one of the ToF sensors 280.

With the first sensor position and orientation of FIGS. 42A-42B, other advantages may be realized. For example, the ToF sensors 280 may not pick up or read the edge of the door panel 102 as a target, where such a positive read by the door panel 102 may raise an erroneous reading. Further, the ToF sensors 280 may be able to capture gestures farther away from the door panel 102. Further still, the sensors 280 may detect an interruption along the field of view 288 or the field of view 290 by comparing the measured distance to the 'jamb distance.' In some embodiments, the door jamb 286 or the door jamb 386 may include an IR reflective sticker/paint/coating applied to improved performance of the ToF sensors 280.

Figure 44:
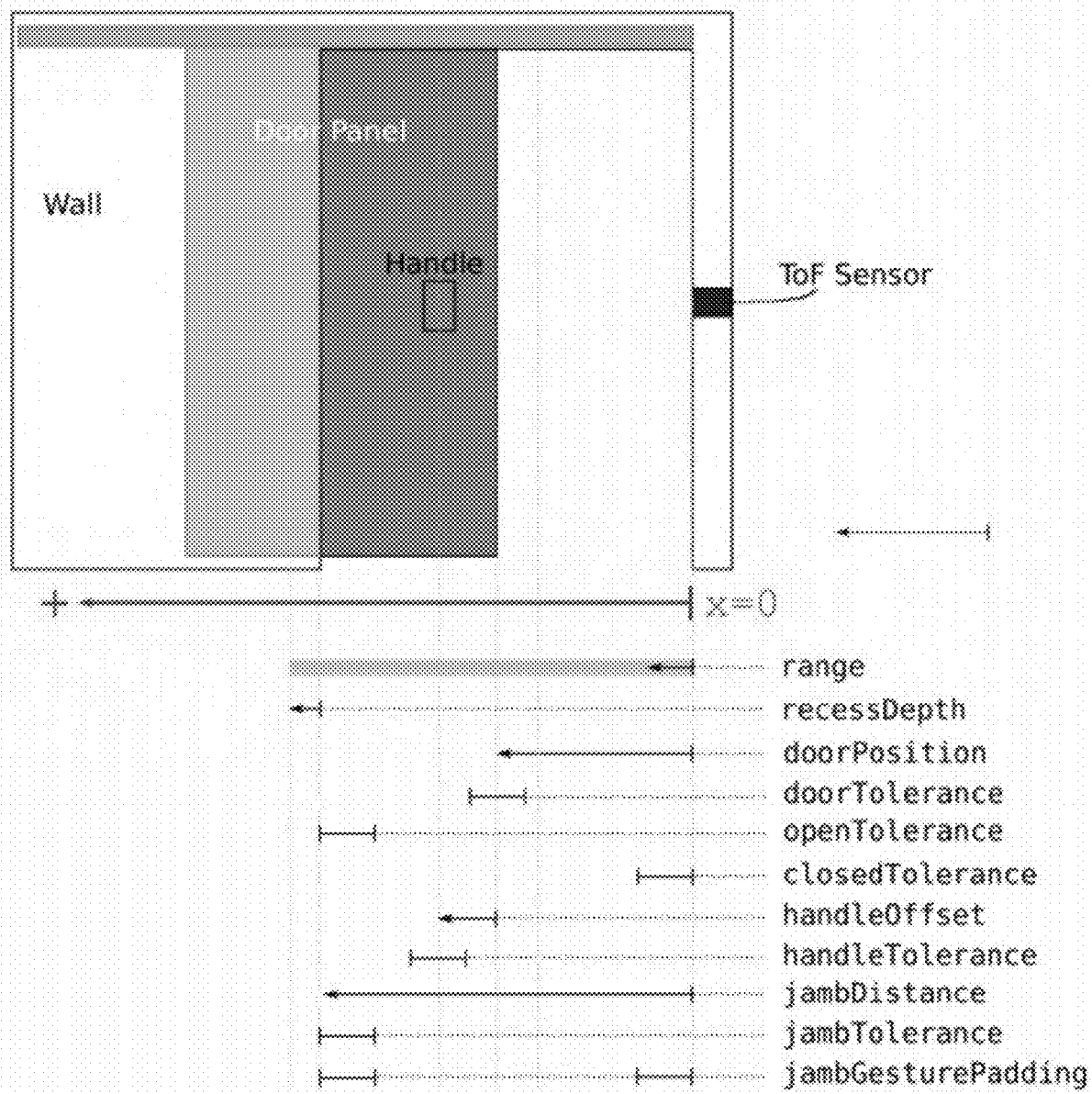
FIG. 44 is a simplified block diagram illustrating implementation of the various algorithms described herein.

Referring to FIG. 44, all dimensions shown and discussed herein relate to the diagram shown, and may be assumed to be in equal units. One actual implementation may use units of mm. Parameter descriptions are shown in Table 1.

TABLE 1

| Parameter | Description | Type |
|---|---|---|
| range | The range reported from one of the ToF to the 'target'. The target may be the opposing jamb, the user's hand, or anything in between | ToF Sensor reading |
| recessDepth | The distance the door 'recesses' into the wall when completely open | Encoder and ToF sensor, possibly user configured |
| doorPosition | The measured door position by the motor encoder. | Encoder |
| doorTolerance | Used to determine if the range is close enough to doorPostition to be considered at the edge of the door. | Tolerance for ToF reading |
| openTolerance | doorPosition must be greater than openTolerance for the door to be considered open | Tolerance for encoder reading |
| closedTolerance | doorPosition must be less than closedTolerence For the door to be considered closed. | Tolerance for encoder reading |
| handleOffset | The distance from the door edge to the door handle, in mm | Configured by the user |
| handleTolerance | The absolute distance away from the handle for which the range is considered to be over the handle | Tolerance for ToF reading |
| jambDistance | The distance to the opposing jamb | ToF Senser |
| jambTolerance | The absolute distance around the actual jambDistance that will be considered an uninterrupted beam. This may be pre-configured at manufacture, calibrated at installation or calculated at runtime. | Pre-Configured Constant, Absolute distance or percentage of opening width |
| jambGesturePadding | The absolute distance from each jamb for which gestures are invalid | Pre-Configured Constant |

Basic Operation: During normal operation of the kinematic control systems 175, 275, or 375, the firmware running on a processor (e.g., processor 702 of FIG. 7) associated with any of these systems may execute an endless loop, sampling the position of all sensors of each system in each iteration.

Pseudo code for a main loop associated with any of the kinematic control systems 175, 275, or 375 may include the following:

```
//Setup initial values
start( ) {
        isFollowing = false;
        isBroken = false;
        isOpen = false;
        isClosed = false;
        numSamples = 0;
        sampleBuffer[ ] = 0;
        index = 0;
        tick = 0;
        isCalibrated = false;
}
//Optional, this determines jambDisance by changing the Field Of View for
//the ToF sensor to include the opposite jamb and averaging several
//samples to get a robust distance average
calibrateToF( ) {
        set_ToF_to_include_jamb( );
        let sampleSum = 0;
        for(i=0; i<numCalibrationSamples; i++) {
                sampleSum += Read_ToF_Sensor( );
        }
        jambDistance = sampleSum / numCalibrationSamples;
        set_ToF_to_not_include_jamb( );
        isCalibrated = true;
}

//Main Loop
while(1) {
        //Calibrate first if we need to
        if (!isCalibrated) {
                calibrateToF( );
                continue;
        }
        //Execute at a fixed interval
        if (abs(t - tick) < interval) {
                read_sensor( );
        }
}
read_sensors( ) {
        range = Read_ToF_Sensors( );
        doorPosition = Read_Motor_Encoder( );
        //Determine if door is closed
        if (doorPosition < closedTolerance) {
                isClosed = true;
        } else {
                isClosed = false;
        }
        //Determine if door is open
        if (doorPosition > openTolerance) {
                isOpen = true;
        } else {
                isOpen = false;
        }
        //Determine if beam is interrupted
if (abs(jambDistance - range) < jambTolerance) {
        isBroken = true;
} else {
        isBroken = false;
        isFollowing = false;
}
//Save readings in a buffer any time the beam is broken
if (isBroken) {
        sampleBuffer[numSamples] = range;
        numSamples++;
}
//Set the door position to match the user's hand
if (!isFollowing
        && abs(doorPosition-range) < doorTolerance
        && isOpen) {
        isFollowing = true;
}
//If following a user's hand, set the command and continue
if (isFollowing) {
        doorCommand = range;
        return;
}
//Check if beam is no longer interrupted and we have enough
//samples for a gesture
if (!isBroken && numSamples > minGestureSamples) {
        analyzeGesture( );
        numSamples = 0;//Restart buffer
```

-continued

```
    }
    return;
}
//This function analyzes a buffer, looking for a gesture
analyzeGesture( ) {
    let delta_x = 0;
    let sum_x = 0;
    let pos_inflections = 0;
    let neg_inflections = 0;
    for(i=1, i<numSamples; i++) {
        delta_x = sampleBuffer[i] - sampleBuffer[i-1];
        sum_x += delta_x;
        //Add up inflections to see if motion is monotonic
        if (delta_x > 0) {
            pos_inflections++;
        } else {
            neg_inflections++;
        }
    }
    //Now, compare stats against pre-calculated constants
    if (numSamples < minGestureSamples && abs(sum_x >
    minGestureSum) {
        if (neg_inflections < monotonicThreshold) {
            //Open the door
            doorCommand = doorOpenPosition;
        };
        if (pos_inflections < monotonicThreshold) {
            //Close the door
            doorCommand = doorClosedPosition;
        };
    }
    return;
}
```

It should be understood that the term encoder such as encoder 115 may apply to any encoder or encoding device; such an optical encoder, a magnetic encoder, or otherwise, and the encoder may include any position sensor, digital or analog.

Aspects of the algorithms, functions, and features described herein may be implemented using one or more computing devices configured with such features or with any similar software components. In some embodiments, these algorithms, functions, and features described herein may be implemented in the form of one or more of an application 502 (shown in FIG. 45), which, when installed to or executed by a computing device 700 (shown in FIG. 45), configures the computing device 700 to provide functionality associated with the operation of a sliding door panel, among other features as described herein. The computing device 700 may include a server, controller, a personal computer, a terminal, a workstation, a portable computer, a mobile device, a tablet, a mainframe, or other such computing device.

In addition, the computing device 700 may be configured for administering and providing access to aspects of the application 502 via a network (not shown), which may include the Internet, an intranet, a virtual private network (VPN), and the like. In some embodiments, a cloud (not shown) may be implemented to execute one or more components of the application 502 or computing device 700. In addition, aspects of the computing device 700 and/or the application 502 may be provided using platform as a service (PaaS), and/or software as a service (SaaS) using e.g., Amazon Web Services, or other distributed systems.

FIG. 45 is an example schematic diagram of the computing device 700 that may implement various algorithms, or methodologies discussed herein. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor or microcontroller, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, WiFi connection, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 502 that supports functionality discussed above. In other words, aspects of the application 502 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the application 502 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A kinematic control system for an automatic sliding panel, comprising:
   a slide and rail assembly comprising a frame defining an opening, a jamb positioned opposite the frame, and a sliding panel operatively engaged within the opening of the frame;
   a motor in operative communication with the sliding panel for controlling movement of the sliding panel;
   a first sensor positioned along an interior side of the frame, the first sensor defining a first field of view;
   a second sensor positioned along an exterior side of the frame opposite the interior side, the second sensor defining a second field of view, the first sensor and the second sensor comprising time of flight sensors, at least one of the first sensor or the second sensor measuring a distance to an object; and
   a microprocessor in operative communication with the first sensor, the second sensor, and with the motor for controlling operation of the sliding panel based on data associated with the object as generated by the first sensor and the second sensor,
   wherein the data associated with the object comprises changes in the distance to the object measured by the at least one of the first sensor or the second sensor, and
   wherein the microprocessor controls the operation of the sliding panel to move in a particular direction by determining the particular direction of motion associated with the object based on the changes in the distance to the object.

2. The kinematic control system of claim 1, wherein the first field of view and the second field of view terminate outside the jamb.

3. The kinematic control system of claim 1, wherein the first sensor and the second sensor are configured to distinguish between a gesture and a person walking between the jamb and the frame.

4. The kinematic control system of claim 1, wherein the jamb includes a reflective component for improving computation of a measurement of a distance to the jamb from the first sensor or the second sensor.

5. The kinematic control system of claim 1, wherein the first sensor and the second sensor detect whether either of the first field of view or the second field of view have been interrupted by the object by comparing a measured distance of the object relative to the first sensor or the second sensor with a jamb distance, the jamb distance defining the distance to the jamb from the first sensor or the second sensor.

6. A kinematic control system for controlling a sliding panel, comprising:
   a first sensor configured for a first side of a frame, the first sensor defining a first field of view;
   a second sensor configured for a second side of the frame, the second sensor defining a second field of view; and
   a processor in operative communication with the first sensor and the second sensor for generating instructions for operation of the sliding panel based on data associated with an object as generated by the first sensor or the second sensor, wherein the data associated with the object indicates a particular direction of motion associated with the object, and the instructions for operation of the sliding panel cause the sliding panel to move in the same direction as the particular direction of motion associated with the object.

7. The kinematic control system of claim 6, wherein the object includes a hand or a body.

8. The kinematic control system of claim 6, wherein the processor is configured to modify the first field of view or the second field of view programmatically by transmitting instructions to the first sensor or the second sensor.

9. The kinematic control system of claim 6, further comprising:
   a motor including an encoder for providing feedback to the processor, the encoder providing feedback for servo positioning and further providing a position of the sliding panel.

10. A system for kinematic control associated with a barrier, comprising:
    a sliding panel;
    a motor in operative communication with the sliding panel for driving movement of the sliding panel;
    a time of flight sensor positioned proximate to the sliding panel for generating measurements including distance based upon data associated with transmission of a light relative to an object; and
    a processor in operative communication with the motor and the time of flight sensor for controlling operation of the sliding panel, the processor being configured to control a position of the sliding panel relative to a frame based on the data,
    wherein the position of the sliding panel is determined by the processor based on changes to the measurements generated by the time of flight sensor.

11. The system of claim 10, wherein the measurements include a position associated with a limb of a user relative to the frame.

12. The system of claim 11, wherein the measurements include distances associated with the limb moving in a first lateral direction relative to the frame.

13. The system of claim 12, wherein the measurements include distances associated with movement of the limb along a second lateral direction that is opposite to the first lateral direction that the processor interprets in order to control the motor to move the sliding panel to a fully open position.

14. The system of claim 13, wherein the first and second lateral directions are in parallel relation or in-line with the movement of the sliding panel.

15. The system of claim 11, wherein motion of the limb in a perpendicular direction away from the sliding panel terminates movement of the sliding panel.

16. The system of claim 11, wherein the processor is further configured to access a plurality of measurements from the time of flight sensor based on the transmission of the light, temporarily store the plurality of measurements within a buffer, and identify one or more gestures of the limb based upon the plurality of measurements.

17. The system of claim 16, wherein the processor controls the motor to cause a predetermined movement of the sliding panel based on a corresponding predetermined gesture of the one or more gestures.

18. The system of claim 16, wherein the processor is configured to identify the one or more gestures by comparing the plurality of measurements to pre-calculated constants associated with the sliding panel and the frame.

19. The system of claim 10, wherein the time of flight sensor generates a reading defining a range from the time of flight sensor to a target.

* * * * *